United States Patent
McLeod

(10) Patent No.: US 11,505,478 B2
(45) Date of Patent: Nov. 22, 2022

(54) AUTOMATED METHODS AND SYSTEMS FOR OPTIMIZED ZETA POTENTIAL CHEMICAL DOSING IN WATER TREATMENT SYSTEMS

(71) Applicant: Marmac Water LLC, Greenwood Village, CO (US)

(72) Inventor: Gregg Allan McLeod, Greenwood Village, CO (US)

(73) Assignee: Marmac Water LLC, Greenwood Village, CO (US)

(*) Notice: Subject to any disclaimer, the term of this patent is extended or adjusted under 35 U.S.C. 154(b) by 0 days.

(21) Appl. No.: 17/549,038

(22) Filed: Dec. 13, 2021

(65) Prior Publication Data
US 2022/0298034 A1    Sep. 22, 2022

Related U.S. Application Data

(60) Provisional application No. 63/360,776, filed on Oct. 29, 2021, provisional application No. 63/259,070, filed on Jun. 21, 2021, provisional application No. 63/207,777, filed on Mar. 22, 2021.

(51) Int. Cl.
*C02F 1/52* (2006.01)
*C02F 1/66* (2006.01)

(52) U.S. Cl.
CPC .......... *C02F 1/5209* (2013.01); *C02F 1/5236* (2013.01); *C02F 1/66* (2013.01); *C02F 2209/001* (2013.01); *C02F 2209/003* (2013.01); *C02F 2209/005* (2013.01); *C02F 2209/02* (2013.01); *C02F 2209/06* (2013.01); *C02F 2209/11* (2013.01)

(58) Field of Classification Search
CPC .................................................. C02F 1/5209
See application file for complete search history.

(56) References Cited

U.S. PATENT DOCUMENTS

| | | |
|---|---|---|
| 4,855,061 A | 8/1989 | Martin |
| 6,241,896 B1 | 6/2001 | La Fargue, Jr. |
| 8,262,914 B2 | 9/2012 | Mitzlaff et al. |
| 9,682,872 B2 | 6/2017 | Criswell |
| 10,829,397 B2 | 11/2020 | Ulmert |
| 2009/0101578 A1 | 4/2009 | McLeod |
| 2009/0308745 A1* | 12/2009 | McLeod .......... C02F 9/00 204/405 |
| 2015/0284263 A1 | 10/2015 | Criswell |
| 2016/0145132 A1 | 5/2016 | Ukai et al. |
| 2017/0234793 A1 | 8/2017 | Gilmore |
| 2017/0341953 A1 | 11/2017 | Criswell |

(Continued)

OTHER PUBLICATIONS

International Search Report and Written Opinion for International (PCT) Patent Application No. PCT/US2022/021293, dated Jun. 14, 2022, 15 pages.

*Primary Examiner* — Peter Keyworth
(74) *Attorney, Agent, or Firm* — Sheridan Ross P.C.

(57) ABSTRACT

The disclosure provides automated methods and systems for optimized dosing of chemicals, such as coagulants, acids, and/or bases, in water treatment processes. The methods and systems of the disclosure can provide a coagulant dosing regimen that mitigates turbidity and organic contaminant content while maintaining effective floc precipitation, agglomeration, and settling without significant human intervention.

26 Claims, 10 Drawing Sheets

(56) References Cited

U.S. PATENT DOCUMENTS

| | | |
|---|---|---|
| 2018/0037471 A1 | 2/2018 | Criswell |
| 2020/0079661 A1 | 3/2020 | Criswell |
| 2020/0407250 A1 | 12/2020 | Ulmert |
| 2021/0155510 A1* | 5/2021 | Hassanzadeh ........ C02F 1/5209 |

* cited by examiner

AUTOMATED METHODS AND SYSTEMS FOR OPTIMIZED ZETA POTENTIAL CHEMICAL DOSING IN WATER TREATMENT SYSTEMS

CROSS REFERENCE TO RELATED APPLICATIONS

This application claims the benefit of priority under 35 U.S.C. § 119(e) to U.S. Provisional Patent Applications 63/207,777, filed 22 Mar. 2021; 63/259,070, filed 21 Jun. 2021; and 63/360,776, filed 29 Oct. 2021. The entireties of all of the above-referenced applications are incorporated herein by reference.

FIELD

The present disclosure relates generally to methods and systems for chemical dosing in water treatment systems, and particularly to automated methods and systems that optimize a chemical dosing regimen based on zeta potential.

BACKGROUND

Facilities that process or clean water, such as municipal drinking water and wastewater treatment facilities and water processing units of food processing facilities, chemical plants, refineries, industrial facilities, and the like, must dose the water being processed with various chemicals, generally including (but not necessarily limited to) coagulants, flocculants, pH adjustment agents (i.e. acids and/or bases), oxidizers, disinfectants, and corrosion inhibitors. Use of these chemicals is necessary to maintain process performance, meet regulatory requirements and cost targets, and so on. Particularly, regulatory requirements, such as the Surface Water Treatment Rules and the Lead and Copper Rule promulgated by the Environmental Protection Agency (EPA), have provided an incentive for these facilities to develop automated methods and systems for coagulant dosing.

One of the most important chemicals in many water treatment processes is a metal salt coagulant. Coagulation is required to remove insoluble turbidity and soluble organic compounds to meet regulatory requirements for drinking water and is used to reduce contaminant levels in industrial water treatment. Coagulation also aids in optimization of various treatment process steps, particularly clarification/sedimentation, flotation, and filtration.

Coagulants used in water treatment must be acidic and/or cationic to neutralize the charges introduced by variations in the turbidity of the source water and to remove organic contaminants, both of which are predominantly anionic. Depending on treatment requirements, any of several coagulants may be used, such as, by way of non-limiting example, aluminum sulfate, polyaluminum chloride, aluminum chlorhydrate, ferric chloride, ferric sulfate, and ferrous sulfate, each of which exhibits optimal performance within a specific pH range. In addition, the performance of some coagulants, such as aluminum sulfate, ferric sulfate, and ferric chloride, depends to a significant extent on the amount of alkalinity (i.e. calcium carbonate content) or total dissolved solids content of the process water.

Generally, water treatment processes employ one of two general types of coagulation regimes: "standard" coagulation, in which the amount of coagulant used is only that required to mitigate turbidity, and "enhanced" coagulation, in which additional coagulant is used to remove at least a portion of soluble organic ions in addition to turbidity particles. However, because the coagulants are acidic, they necessarily depress the pH of the process water. Thus, while "enhanced" coagulation can be achieved by increasing the dosages of coagulant beyond that needed to mitigate turbidity, this must be balanced against regulatory or process limits on the amount of coagulant that can be used, as well as clarifier or flotation performance, as reductions in pH tend to inhibit floc precipitation, agglomeration, and settling. An optimized coagulant dosing regimen mitigates turbidity and organic contaminant content while maintaining effective floc precipitation, agglomeration, and settling.

Coagulants precipitate from the water being treated as charged particles. The extent and rate of precipitation is strongly dependent upon pH, as the particles tend to be insoluble only within a particular pH range; outside of the optimal pH range, the coagulant tends to form soluble hydroxides, which reduces coagulant performance and may require additional steps to treat or remove the coagulant downstream. The optimal pH range is, in turn, strongly dependent upon temperature, i.e. an increase or decrease in water temperature will "shift" the ideal pH range, with the ideal pH range being higher in colder water and lower in warmer water. The "shift" or "moving target" pH range is also dependent on the ion saturation/total dissolved solids content of the water; a higher total dissolved solids content increases the buffering capacity of the water, thereby widening the optimal pH range. All of these factors also relate to the pH and alkalinity of the "raw" incoming process water, as low alkalinity/pH reduces the buffering ability of the water and requires greater sensitivity of process control.

Given all of these factors, and the often-complex relationships between them, optimization of coagulant dosing and pH control can be challenging. Secondary coagulant control requires maintenance of a specific particle charge (zeta potential or streaming current) value, and while "enhanced" coagulation is well-known, compensating for the effects of water temperature, "raw" water pH, total dissolved solids content, organics content, etc. is not. Presently, multivariate coagulant control (i.e. control of coagulant dosing based on water temperature, "raw" water pH, total dissolved solids content, organics content, etc.) is not offered commercially or known to be in development; no commercial supplier of streaming current analyzers, zeta potential analyzers, or pH controllers provide for the type of multivariate control needed to maintain an optimal coagulant dosing regimen, and no known coagulant manufacturers provide or recommend this type of control. Even more strikingly, very few treatment systems even employ pH control in association with coagulation.

An additional effect of dissolved solids in the water to be treated is that a higher total dissolved solids content will inhibit the removal of soluble organic contaminants. This result occurs because the coagulants are capable of adsorbing medium-molecular weight organic ions and higher; thus, when the buffering capacity of the water increases as a result of a higher dissolved solids content, the coagulants' ability to remove soluble organics decreases. Acidification and/or pH suppression of the water are also known to increase adsorption of soluble organics by the coagulant. These effects present a significant challenge in coagulant dosing because the EPA requires removal of a certain amount of total organic carbon (TOC) based on alkalinity, which is used as a proxy for total dissolved solids. Given these effects, and because the optimal pH range "widens" with increasing total dissolved solids content, an automated chemical dosing and control system can "adjust" the water temperature-compensated pH set point to optimize the degree of soluble organic removal without requiring an increase in the coagulant dose, while also limiting pH suppression to avoid deterioration in floc precipitation and agglomeration, which as mentioned above can negatively affect clarifier and filter performance.

Manually controlled chemical dosing frequently causes overdosing of coagulant, which increases both operating costs and the corrosivity of the treated water. Automating chemical dosing can therefore reduce these negative effects, and improve the ease of sludge removal and pH control, by reducing overdosing. Automating the dosing of coagulant, particularly, also reduces the corrosivity of the water by reducing pH suppression, maintaining water alkalinity, and, in the case of chloride-based coagulants, reducing the chloride-to-sulfate mass ratio (CSMR), which is recognized as a major contributor to corrosion by lead and copper leaching. Moreover, changes in the characteristics (turbidity, concentrations of organics and metals, etc.) can vary, for example due to rainfall or snowmelt or source water change and as a result it may be necessary to make continual and/or seasonal adjustments in chemical dosing regimens; successful automation of chemical dosing can take these adjustments into account.

The needed amount of downstream disinfection by chlorination or chloramination can vary depending on the amount of soluble organic contaminants removed upstream by coagulants via "enhanced" coagulation. Regulatory requirements for the concentrations in the treated water of disinfection byproducts (DBPs), such as trihalomethanes (THMs) and haloacetic acids (HAAs), generally depend on water temperature, and as a result the amount of soluble organics that must be removed may vary seasonally. This provides yet another way in which automated chemical dosing of either or both of the coagulant(s) and the disinfectant(s) may improve treatment performance and allow water treatment systems and methods to meet regulatory requirements without overdosing. However, current automated disinfection control systems generally do not monitor or otherwise account for the coagulant dosing regimen, which in turn is affected not only by water temperature but also by detention time.

Still other complexities of water treatment processes and/or drawbacks and shortcomings of currently available control systems further complicate chemical dosing regimens. Metal salt coagulants reduce pH and consume alkalinity, thus increasing the corrosivity of the process water; this effect, coupled with variations in source water composition and "moving-target" regulatory requirements, makes it difficult to monitor and maintain corrosion variables. Additionally, the inaccuracy of in-line sensors (e.g. pH sensors, turbidity sensors, alkalinity sensors, particle charge sensors, etc.) has, to date, prevented successful fully automated chemical dosing control. Present and future regulatory requirements put additional pressure on water treatment systems to provide fully automated chemical dosing capabilities.

Finally, in many water treatment processes, an organic polymer is co-dosed with the coagulant to assist with agglomeration of floc particles into floc masses and sweep up additional colloidal particles. The optimal coagulant doses, and therefore also the optimal polymer doses, are related to the particle charge of the process water, but it is often a challenge to identify this optimal polymer dose; while many operators simply maintain a linear relationship between polymer dose and coagulant dose, this does not address the actual polymer demand, because zeta potential/streaming current do not depend linearly on coagulant dose.

There is thus a need in the art for systems and methods for automated dosing of chemicals in water treatment processes that overcome the above-mentioned drawbacks.

SUMMARY

The present disclosure provides methods and systems for automated chemical dosing in water treatment processes and systems. The methods and systems of the present disclosure can automatically, without human intervention, dose a metal salt coagulant into a water treatment process in a manner that maintains optimal floc precipitation, formation, and agglomeration and removal of soluble organic contaminants over a wide range of water quality conditions by utilizing a zeta potential analyzer in combination with other analyzers and sensors. While there have been previous attempts to automate coagulant dosing using various approaches, such as streaming current meters, zeta meters, and turbidimeters, the inefficiency of these parameters forces most water treatment operators to manually set chemical dosing rates. The methods and systems of the present disclosure overcome these drawbacks to allow for fully automated chemical dosing.

At present, even those control systems that attempt to automate zeta potential control do not compensate for variations in pH, water temperature, and/or total dissolved solids content. The methods and systems of the present disclosure address this drawback and provide a control logic that incorporates flow pacing, streaming current or zeta potential (via particle charge measurement), total dissolved solids content, pH, and water temperature to facilitate "standard" coagulation, and can additionally incorporate an "organics" signal, such as total organic carbon (TOC), absorbance or transmittance of the water at an ultraviolet wavelength of 254 nanometers (UV254), or specific ultraviolet absorbance (SUVA), to facilitate "enhanced" coagulation. The control logics of the methods and systems of the present disclosure can still further incorporate an additional signal, e.g. electrical conductivity or alkalinity, to further optimize chemical dosing control, as the removal of soluble organics is related to the alkalinity/hardness of the process water (higher soluble organic removal is achieved at lower alkalinity and vice versa). Thus, the methods and systems of the present disclosure enable truly and fully automated coagulant dosing by considering changes, alternations, or variations of the source water and regulatory and/or intended use requirements.

The methods and systems of the present invention, in addition to improving the efficiency of dosing of coagulants and/or other chemicals in water treatment processes, have further unexpected and surprising advantages and benefits. By way of first non-limiting example, the methods and systems of the present disclosure may reduce corrosion by preventing overdosing of the acidic coagulant, thus preventing excessive pH depression and consumption of alkalinity and maintaining more favorable ion saturation indices and CSMR. By way of second non-limiting example, the methods and systems of the present disclosure may improve the effectiveness of disinfection (e.g. chlorination or chloramination) steps in the water treatment process by reducing and/or optimizing the necessary dose of disinfectant. By way of third non-limiting example, the methods and systems of the present disclosure may improve regulatory compliance by allowing water treatment system operators to more easily and consistently ensure achievement of various targets in the treated water, e.g. TOC, DBP, turbidity, and/or metal contaminant (lead, copper, iron, manganese, etc.) targets.

Embodiments of the present disclosure include "standard coagulation" embodiments, in which the control logic provides automated dosing of coagulant for optimized turbidity mitigation. Further embodiments of the present disclosure include "enhanced coagulation" embodiments, in which the control logic provides optimized turbidity mitigation and soluble organic removal. Still further embodiments of the present disclosure include "total system" embodiments, in which the control logic incorporates the features of "standard coagulation" or "enhanced coagulation" embodiments, plus further features to additionally address one or more water treatment goals, e.g. mitigation or minimization of corrosion, improved disinfection, regulatory compliance, and so on. Yet further embodiments of the present disclosure may include specific control features selected from any one or more of "standard coagulation," "enhanced coagulation," and "total system" embodiments. Some embodiments of the present disclosure may enable quick and easy switching between any two or more of a "standard coagulation" control scheme, an "enhanced coagulation" control scheme, and a "total system" control scheme.

In embodiments of the present disclosure, full-time monitoring of multiple ion saturation indices, as the EPA recommends, can benefit process control in water treatment systems. Additionally, utilizing chemical molar calculations based on various chemical dosing regimens provides further benefits to full-time corrosion monitoring. Continual monitoring and control of total chlorides and sulfates (from all sources, including the source water, chloride- and/or sulfate-based coagulants, sulfonated polyaluminum chloride coagulants, disinfectants, etc.), and the CSMR relationship between them, provides another important chemical/molar monitoring and control parameter. The methods and systems of the present invention enable continual or continuous monitoring of these and other parameters and allow these parameters to be taken into account by the automated process control logic to provide for optimized chemical dosing.

In embodiments of the present disclosure, incorporating chemical molar calculations and analyzer comparisons can ensure accurate input reporting and compensate for potential inaccuracies of in-line sensors and analyzers. By way of non-limiting example, chemical molar calculators can compare readings from multiple separate pH sensors at different points in the water treatment process (e.g. at the raw water input, in the rapid mix, and post-treatment) and, based on this comparison, predict which of the several sensors may be inaccurate in the case of inconsistent readings. Additionally or alternatively, a single pH sensor can incorporate chemical molar calculators to determine an accurate pH level without requiring additional sensors.

In some embodiments, the methods and systems of the present disclosure can incorporate machine learning algorithms to implement any one or more of several functions. By way of non-limiting example, machine learning software can store data relating to spikes or troughs in turbidity resulting from weather events, and the resulting chemical dosing response, to optimize and fine-tune chemical dosing responses to future storm events.

The methods and systems of the present disclosure can comprise or be implemented by a computerized system. Particularly, the methods and systems may comprise or be implemented by a master control panel fitted with either a programmable logic controller (PLC) or a microprocessor may monitor analyzer inputs and activate chemical dosing as needed based on control variables, such as water pH and/or temperature (to regulate acid and/or base dosing) and zeta potential (to regulate coagulant dosing). In some embodiments, the methods and systems of the disclosure may comprise at least two separate control loops, one to control pH correction and the other to control coagulant dosing, or a similar control architecture.

In an aspect of the present disclosure, an automated chemical dosing system for a water treatment process comprises a computer; a coagulant dosing device; an acid/base dosing device; a flow meter, positioned upstream of the coagulant dosing device and the acid/base dosing device and configured to collect data relating to a flowrate of a water stream and communicate these data to the computer; at least one pH and temperature sensor, positioned downstream of the coagulant dosing device and the acid/base dosing device and configured to collect data relating to the pH and temperature of the water stream and communicate these data to the computer; and a particle charge sensor, positioned downstream of the coagulant dosing device and the acid/base dosing device and configured to collect data relating to a particle charge parameter of the water stream and communicate these data to the computer, wherein the particle charge parameter comprises at least one of zeta potential and streaming current, wherein the computer comprises a processor and a non-transitory computer-readable medium storing instructions that, when executed by the processor, cause the processor to perform the steps of (a) determining, in a first PID control loop and based on the data communicated to the computer, a target pH setpoint or range; (b) commanding, in the first PID control loop, the acid/base dosing device to increase, decrease, or maintain an acid or base dosing rate to achieve the target pH setpoint or range; (c) determining, in a second PID control loop and based on the data communicated to the computer, a target particle charge parameter setpoint or range; and (d) commanding, in the second PID control loop, the coagulant dosing device to increase, decrease, or maintain a coagulant dosing rate to achieve the target particle charge parameter setpoint or range.

In embodiments, the automated chemical dosing system may further comprise an alkalinity sensor, positioned upstream of the coagulant dosing device and the acid/base dosing device and configured to collect data relating to the alkalinity of the water stream and communicate these data to the computer. The automated chemical dosing system may, but need not, further comprise an organics sensor selected from the group consisting of a TOC sensor, a UV254 sensor, and a SUVA sensor, positioned downstream of the coagulant dosing device and the acid/base dosing device, and configured to collect data relating to the organic contaminant content of the water stream and communicate these data to the computer, and the instructions, when executed by the processor, may, but need not, cause the processor to further perform the step of determining, in a third PID control loop and based on the data communicated to the computer, a target organic content setpoint or range. The instructions, when executed by the processor, may, but need not, cause the processor to further perform the step of commanding, in the third PID control loop, the coagulant dosing device to increase, decrease, or maintain a coagulant dosing rate to achieve the target organic content setpoint or range. The instructions, when executed by the processor, may, but need not, cause the processor to further perform the steps of determining, in the third PID control loop, whether the target organic content setpoint or range is below an enhanced coagulation threshold; and if the target organic content setpoint or range is below the enhanced coagulation threshold, commanding, in the third PID control loop, the coagulant dosing device to increase, decrease, or maintain a coagulant dosing rate to achieve the target organic content setpoint or range. The automated chemical dosing system may, but need not, further comprise a sensor configured to collect data relating to a distribution system detention time parameter and communicate these data to the computer, and the instructions, when executed by the processor, may, but need not, cause the processor to further perform the steps of calculating, in the third PID control loop and based on the data communicated to the computer, a target disinfection byproduct (DBP) content setpoint or range; determining whether the target DBP content setpoint or range is below a DBP content threshold; and if the target DBP content setpoint or range is below the DBP content threshold, commanding, in the third PID control loop, the coagulant dosing device to increase, decrease, or maintain a coagulant dosing rate to achieve the target DBP content setpoint or range. The automated chemical dosing system may, but need not, further comprise a chlorine dosing device, positioned downstream of the coagulant dosing device and the acid/base dosing device; and any one or more of: a turbidity sensor, positioned upstream of the coagulant dosing device and the acid/base dosing device and configured to collect data relating to the turbidity of the water stream and communicate these data to the computer; an iron and/or manganese content sensor, positioned upstream of the coagulant dosing device and the acid/base dosing device and configured to collect data relating to the iron and/or manganese content of the water stream and communicate these data to the computer; an additional organics sensor selected from the group consisting of a TOC sensor and a UV254 sensor, positioned upstream of the coagulant dosing device and the acid/base dosing device or downstream of the chlorine dosing device, and configured to collect data relating to the organic contaminant content of the water stream and communicate these data to the computer; at least one additional pH and temperature sensor, positioned upstream of the coagulant dosing device and the acid/base dosing device or downstream of the chlorine dosing device and configured to collect data relating to the pH and temperature of the water stream and communicate these data to the computer; and at least one sensor positioned downstream of the chlorine dosing device and configured to collect data relating to the concentration of at least one of chloride, sulfate, and chlorine in the water stream and communicate these data to the computer, and the instructions, when executed by the processor, may, but need not, cause the processor to further perform the steps of determining, in a fourth PID control loop and based on the data communicated to the computer, a target disinfection parameter setpoint or range; and commanding, in the fourth PID control loop, the chlorine dosing device to increase, decrease, or maintain a chlorine dosing rate to achieve the target disinfection parameter setpoint or range.

In embodiments, the automated chemical dosing system may further comprise a mixing device configured to mix into the water stream at least one of a dose of acid or base introduced by the acid/base dosing device and a dose of coagulant introduced by the coagulant dosing device.

In embodiments, the instructions, when executed by the processor, may cause the processor to further perform the step of calculating, based on the data communicated to the computer, a concentration of disinfection byproducts (DBP) in the water stream.

In embodiments, the instructions, when executed by the processor, may cause the processor to further perform at least one step selected from the group consisting of (i) calculating a chloride to sulfate mass ratio (CSMR) and (ii) updating, based on the data communicated to the computer, at least one ion saturation index. The instructions, when executed by the processor, may, but need not, cause the processor to further perform the step of comparing data from a first pH sensor and data from a second pH sensor to check the accuracy of the updated ion saturation index. The instructions, when executed by the processor, may, but need not, cause the processor to further perform the step of calculating, based on the ion saturation index and a measured pH of the water stream at a first point, an estimated pH of the water stream at a second point.

In embodiments, the automated chemical dosing system may further comprise a turbidity sensor, positioned upstream of the coagulant dosing device and the acid/base dosing device and configured to collect data relating to the turbidity of the water stream and communicate these data to the computer, and the instructions, when executed by the processor, may cause the processor to further perform the step of providing an auditory or visual signal via an output device of the computer when the turbidity of the water stream exceeds a predetermined threshold.

In embodiments, the computer may further comprise a computer memory storing a data structure corresponding to past or historical water treatment conditions and outcomes, and the processor may implement a machine learning algorithm based on the past or historical water treatment conditions and outcomes when performing at least one of the determining steps.

In embodiments, the automated chemical dosing system may further comprise at least one sensor configured to collect data relating to an ion saturation parameter of the water stream and communicate these data to the computer, and the ion saturation parameter may be at least one of alkalinity-as-calcium-carbonate and conductivity.

In embodiments, the target pH setpoint or range may correspond to the lowest pH at which the target particle charge parameter setpoint or range can be achieved.

In embodiments, at least one of the following may be true: (i) the coagulant dosing device is positioned upstream of the acid/base dosing device; and (ii) the at least one pH and temperature sensor is positioned upstream of the particle charge sensor.

In embodiments, the instructions, when executed by the processor, may cause the processor to further perform the step of modifying an algorithm of at least one of the first PID control loop and a second PID control loop to prevent interference between the first and second PID control loops.

In embodiments, the instructions, when executed by the processor, may cause the processor to delay performing one of steps (a), (b), (c), and (d) until a predetermined time has passed since performing a different one of steps (a), (b), (c), and (d).

In embodiments, the computer may further comprise a computer memory storing a data structure in which a lookup table is encoded, the lookup table may correspond to an optimal pH for the coagulant at each of a plurality of water temperatures, and the processor may perform a lookup in the lookup table when performing at least one of the determining steps.

In embodiments, the coagulant may comprise aluminum chlorhydrate and at least one of the following may be true: (i) a temperature of the water stream measured by the at least one pH and temperature sensor is between about 0.5° C. and about 5° C. and the target pH setpoint or range includes at least one pH between about pH 7.96 and about pH 8.02; (ii) a temperature of the water stream measured by the at least one pH and temperature sensor is between about 5° C. and about 10° C. and the target pH setpoint or range includes at least one pH between about pH 7.86 and about pH 7.96; (iii) a temperature of the water stream measured by the at least one pH and temperature sensor is between about 10° C. and about 15° C. and the target pH setpoint or range includes at least one pH between about pH 7.72 and about pH 7.86; (iv) a temperature of the water stream measured by the at least one pH and temperature sensor is between about 15° C. and about 17° C. and the target pH setpoint or range includes at least one pH between about pH 7.66 and about pH 7.72; (v) a temperature of the water stream measured by the at least one pH and temperature sensor is between about 17° C. and about 20° C. and the target pH setpoint or range includes at least one pH between about pH 7.53 and about pH 7.66; (vi) a temperature of the water stream measured by the at least one pH and temperature sensor is between about 20° C. and about 22° C. and the target pH setpoint or range includes at least one pH between about pH 7.42 and about pH 7.53; (vii) a temperature of the water stream measured by the at least one pH and temperature sensor is between about 22° C. and about 25° C. and the target pH setpoint or range includes at least one pH between about pH 7.22 and about pH 7.42; (viii) a temperature of the water stream measured by the at least one pH and temperature sensor is between about 25° C. and about 27° C. and the target pH setpoint or range includes at least one pH between about pH 7.07 and about pH 7.22; and (ix) a temperature of the water stream measured by the at least one pH and temperature sensor is between about 27° C. and about 30° C. and the target pH setpoint or range includes at least one pH between about pH 6.80 and about pH 7.07.

In embodiments, the coagulant may comprise polyaluminum chloride and at least one of the following may be true: (i) a temperature of the water stream measured by the at least one pH and temperature sensor is between about 0.5° C. and about 5° C. and the target pH setpoint or range includes at least one pH between about pH 7.55 and about pH 7.61; (ii) a temperature of the water stream measured by the at least one pH and temperature sensor is between about 5° C. and about 10° C. and the target pH setpoint or range includes at least one pH between about pH 7.45 and about pH 7.55; (iii) a temperature of the water stream measured by the at least one pH and temperature sensor is between about 10° C. and about 15° C. and the target pH setpoint or range includes at least one pH between about pH 7.31 and about pH 7.45; (iv) a temperature of the water stream measured by the at least one pH and temperature sensor is between about 15° C. and about 17° C. and the target pH setpoint or range includes at least one pH between about pH 7.24 and about pH 7.31; (v) a temperature of the water stream measured by the at least one pH and temperature sensor is between about 17° C. and about 20° C. and the target pH setpoint or range includes at least one pH between about pH 7.12 and about pH 7.24; (vi) a temperature of the water stream measured by the at least one pH and temperature sensor is between about 20° C. and about 22° C. and the target pH setpoint or range includes at least one pH between about pH 7.00 and about pH 7.12; (vii) a temperature of the water stream measured by the at least one pH and temperature sensor is between about 22° C. and about 25° C. and the target pH setpoint or range includes at least one pH between about pH 6.79 and about pH 7.00; (viii) a temperature of the water stream measured by the at least one pH and temperature sensor is between about 25° C. and about 27° C. and the target pH setpoint or range includes at least one pH between about pH 6.64 and about pH 6.79; and (ix) a temperature of the water stream measured by the at least one pH and temperature sensor is between about 27° C. and about 30° C. and the target pH setpoint or range includes at least one pH between about pH 6.37 and about pH 6.64.

In embodiments, the coagulant may comprise aluminum sulfate and at least one of the following may be true: (i) a temperature of the water stream measured by the at least one pH and temperature sensor is between about 0.5° C. and about 5° C. and the target pH setpoint or range includes at least one pH between about pH 7.43 and about pH 7.49; (ii) a temperature of the water stream measured by the at least one pH and temperature sensor is between about 5° C. and about 10° C. and the target pH setpoint or range includes at least one pH between about pH 7.33 and about pH 7.43; (iii) a temperature of the water stream measured by the at least one pH and temperature sensor is between about 10° C. and about 15° C. and the target pH setpoint or range includes at least one pH between about pH 7.19 and about pH 7.33; (iv) a temperature of the water stream measured by the at least one pH and temperature sensor is between about 15° C. and about 17° C. and the target pH setpoint or range includes at least one pH between about pH 7.12 and about pH 7.19; (v) a temperature of the water stream measured by the at least one pH and temperature sensor is between about 17° C. and about 20° C. and the target pH setpoint or range includes at least one pH between about pH 7.00 and about pH 7.12; (vi) a temperature of the water stream measured by the at least one pH and temperature sensor is between about 20° C. and about 22° C. and the target pH setpoint or range includes at least one pH between about pH 6.90 and about pH 7.00; (vii) a temperature of the water stream measured by the at least one pH and temperature sensor is between about 22° C. and about 25° C. and the target pH setpoint or range includes at least one pH between about pH 6.72 and about pH 6.90; (viii) a temperature of the water stream measured by the at least one pH and temperature sensor is between about 25° C. and about 27° C. and the target pH setpoint or range includes at least one pH between about pH 6.56 and about pH 6.72; and (ix) a temperature of the water stream measured by the at least one pH and temperature sensor is between about 27° C. and about 30° C. and the target pH setpoint or range includes at least one pH between about pH 6.30 and about pH 6.56.

In embodiments, the coagulant may comprise ferric chloride and at least one of the following may be true: (i) a temperature of the water stream measured by the at least one pH and temperature sensor is between about 0.5° C. and about 5° C. and the target pH setpoint or range includes at least one pH between about pH 6.52 and about pH 6.57; (ii) a temperature of the water stream measured by the at least one pH and temperature sensor is between about 5° C. and about 10° C. and the target pH setpoint or range includes at least one pH between about pH 6.39 and about pH 6.52; (iii) a temperature of the water stream measured by the at least one pH and temperature sensor is between about 10° C. and about 15° C. and the target pH setpoint or range includes at least one pH between about pH 6.27 and about pH 6.39; (iv) a temperature of the water stream measured by the at least one pH and temperature sensor is between about 15° C. and about 17° C. and the target pH setpoint or range includes at least one pH between about pH 6.21 and about pH 6.27; (v) a temperature of the water stream measured by the at least one pH and temperature sensor is between about 17° C. and about 20° C. and the target pH setpoint or range includes at least one pH between about pH 6.10 and about pH 6.21; (vi) a temperature of the water stream measured by the at least one pH and temperature sensor is between about 20° C. and about 22° C. and the target pH setpoint or range includes at least one pH between about pH 5.99 and about pH 6.10; (vii) a temperature of the water stream measured by the at least one pH and temperature sensor is between about 22° C. and about 25° C. and the target pH setpoint or range includes at least one pH between about pH 5.77 and about pH 5.99; (viii) a temperature of the water stream measured by the at least one pH and temperature sensor is between about 25° C. and about 27° C. and the target pH setpoint or range includes at least one pH between about pH 5.57 and about pH 5.77; and (ix) a temperature of the water stream measured by the at least one pH and temperature sensor is between about 27° C. and about 30° C. and the target pH setpoint or range includes at least one pH between about pH 5.27 and about pH 5.57.

In embodiments, the automated chemical dosing system may further comprise a polymer dosing device, and the instructions, when executed by the processor, may cause the processor to further perform the steps of (e) determining, in a polymer dosing PID control loop and based on the data communicated to the computer and the coagulant dosing rate, a target polymer dosing rate setpoint or range; and (f) commanding, in the polymer dosing PID control loop, the polymer dosing device to increase, decrease, or maintain a polymer dosing rate to achieve the polymer dosing rate setpoint or range. The polymer dosing PID control loop may, but need not, be the first PID control loop or the second PID control loop. The polymer dosing PID control loop may, but need not, be separate from the first and second PID control loops. The computer may, but need not, further comprise a computer memory storing a data structure in which a lookup table is encoded, the lookup table may, but need not, correspond to an optimal polymer dosing rate at each of a plurality of coagulant concentrations, and the processor may, but need not, perform a lookup in the lookup table when performing step (e).

In an aspect of the present disclosure, a method for dosing chemicals in a water treatment process comprises (a) determining, in a first PID control loop and based on data collected by at least one of a flow meter, a pH and temperature sensor, and a particle charge sensor, a target pH setpoint or range for a water stream; (b) commanding, in the first PID control loop, an acid/base dosing device to increase, decrease, or maintain an acid or base dosing rate to achieve the target pH setpoint or range in the water stream; (c) determining, in a second PID control loop and based on the data collected by at least one of a flow meter, a pH and temperature sensor, and a particle charge sensor, a target particle charge parameter setpoint or range for the water stream, wherein the particle charge parameter comprises at least one of zeta potential and streaming current; and (d) commanding, in the second PID control loop, a coagulant dosing device to increase, decrease, or maintain a coagulant dosing rate to achieve the target particle charge parameter setpoint or range in the water stream.

In an aspect of the present disclosure, a non-transitory computer-readable medium stores instructions that, when executed by a computer processor, cause the computer processor to perform a method comprising (a) determining, in a first PID control loop and based on data collected by at least one of a flow meter, a pH and temperature sensor, and a particle charge sensor, a target pH setpoint or range for a water stream; (b) commanding, in the first PID control loop, an acid/base dosing device to increase, decrease, or maintain an acid or base dosing rate to achieve the target pH setpoint or range in the water stream; (c) determining, in a second PID control loop and based on the data collected by at least one of a flow meter, a pH and temperature sensor, and a particle charge sensor, a target particle charge parameter setpoint or range for the water stream, wherein the particle charge parameter comprises at least one of zeta potential and streaming current; and (d) commanding, in the second PID control loop, a coagulant dosing device to increase, decrease, or maintain a coagulant dosing rate to achieve the target particle charge parameter setpoint or range in the water stream.

While specific embodiments and applications have been illustrated and described, the present disclosure is not limited to the precise configuration and components described herein. Various modifications, changes, and variations which will be apparent to those skilled in the art may be made in the arrangement, operation, and details of the methods and systems disclosed herein without departing from the spirit and scope of the overall disclosure.

As used herein, unless otherwise specified, the terms "about," "approximately," etc., when used in relation to numerical limitations or ranges other than pH values, mean that the recited limitation or range may vary by up to 10%. By way of non-limiting example, "about 750" can mean as little as 675 or as much as 825, or any value therebetween. When used in relation to ratios or relationships between two or more numerical limitations or ranges, the terms "about," "approximately," etc. mean that each of the limitations or ranges may vary by up to about 10%; by way of non-limiting example, a statement that two quantities are "approximately equal" can mean that a ratio between the two quantities is as little as 0.9:1.1 or as much as 1.1:0.9 (or any value therebetween), and a statement that a four-way ratio is "about 5:3:1:1" can mean that the first number in the ratio can be any value of at least 4.5 and no more than 5.5, the second number in the ratio can be any value of at least 2.7 and no more than 3.3, and so on. As used herein in relation to pH values, unless otherwise specified, the terms "about," "approximately," etc. mean that the recited limitation or range may vary by up to 0.2 standard pH units, e.g. "about pH 7" can mean as little as pH 6.8 and as much as pH 7.2 (or any value therebetween).

The embodiments and configurations described herein are neither complete nor exhaustive. As will be appreciated, other embodiments are possible utilizing, alone or in combination, one or more of the features set forth above or described in detail below.

DETAILED DESCRIPTION

Figure 1:
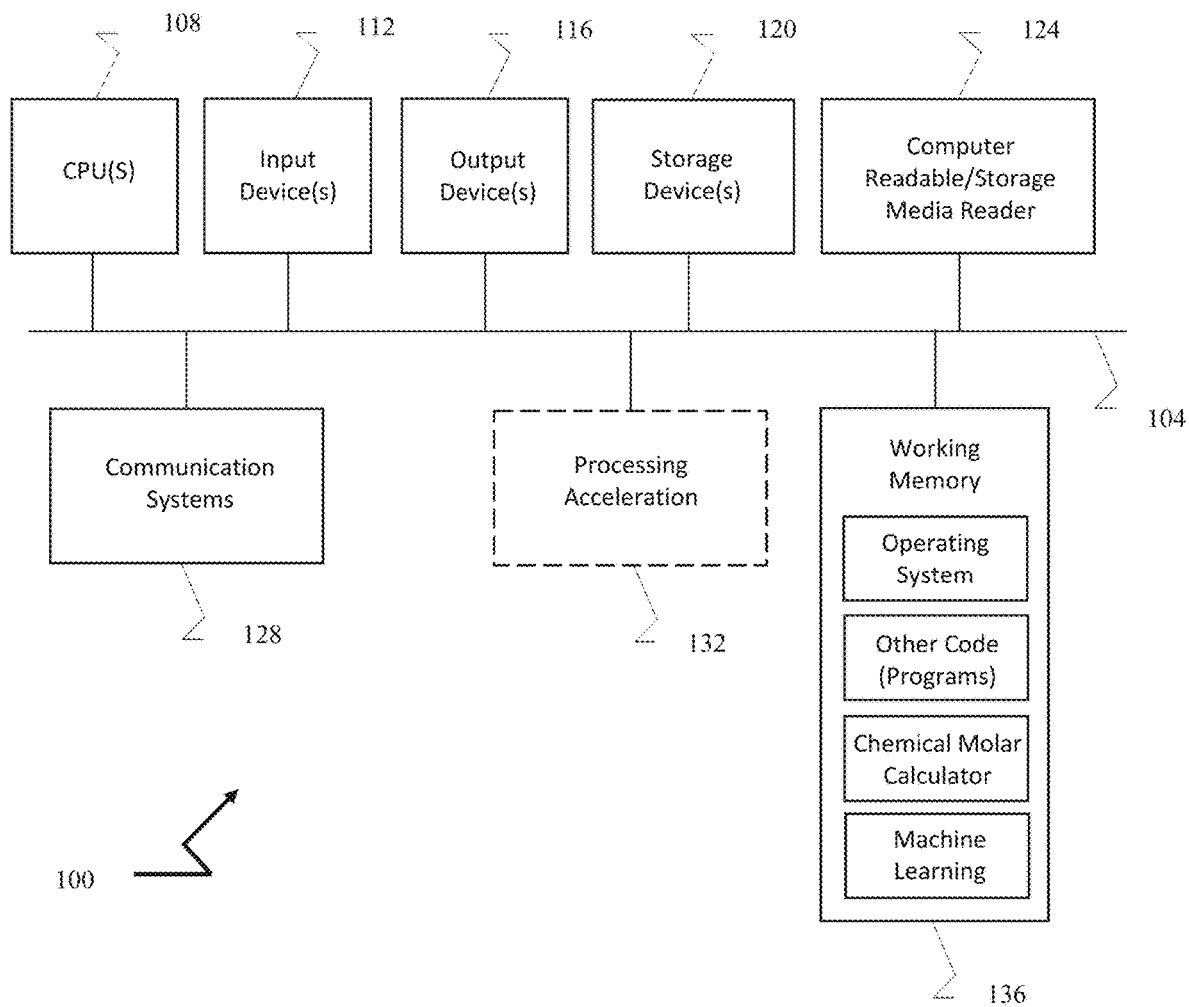
FIG. 1 is a schematic illustrating main components of a computerized system for implementing automated chemical dosing, according to embodiments of the present disclosure.

Unless defined otherwise, all technical and scientific terms used herein have the same meaning as is commonly understood by one of ordinary skill in the art. All patents, applications, published applications, and other publications to which reference is made herein are incorporated by reference in their entirety. If there is a plurality of definitions for a term herein, the definition provided in the Summary prevails unless otherwise stated.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

In embodiments of the present disclosure, a chemical dosing system optimizes metal salt coagulant dosing for the mitigation of source water turbidity, i.e. provides for "standard" coagulation. In these embodiments, the chemical dosing system and/or a control logic implemented thereby incorporates at least the inputs of source water flow rate, particle charge (e.g. as measured by a zeta potential analyzer or streaming current analyzer), source water pH, and source water temperature. The chemical dosing system and/or control logic implemented thereby will take into account the water-temperature adjusted "optimal" pH values for a particular coagulant in a "standard" coagulation scheme, which the present inventor has found to be, by way of non-limiting examples, about pH 7.43 at 0.5° C. and about pH 6.30 at 30° C. for aluminum sulfate, about pH 7.55 at 0.5° C. and about pH 6.37 at 30° C. for polyaluminum chloride, about pH 7.96 at 0.5° C. and about pH 6.80 at 30° C. for aluminum chlorhydrate, and about pH 6.52 at 0.5° C. and about pH 5.27 at 30° C. for ferric chloride and/or ferric sulfate. In these embodiments, a first PID loop (hereinafter the "pH PID loop") maintains the "optimal" pH setpoint for a preselected coagulant by controlled dosing of acid and/or base into the source water, and can make dynamic, real-time adjustments to the pH setpoint based on fluctuations in source water temperature. Simultaneously, a second PID loop (hereinafter the "particle charge PID loop") also maintains an "optimized" particle charge (zeta potential and/or streaming current) setpoint by controlled dosing of coagulant. The pH PID loop may further take into account additional water quality factors, such as alkalinity, water hardness, and the like, and accordingly adjust the pH setpoint and/or the acceptable deviation from the pH setpoint; in general, high alkalinity and/or hardness broadens the "optimal" pH range and low alkalinity and/or hardness tightens the "optimal" pH range. In some embodiments, the chemical dosing system may allow an operator or technician to make manual adjustments to one or more setpoints and/or the underlying control logic, based on source water quality and other factors.

In embodiments of the present disclosure, a chemical dosing system optimizes metal salt coagulant dosing for the mitigation of source water turbidity and the removal of at least some organic contaminants, i.e. provides for "enhanced" coagulation. In these embodiments, the chemical dosing system and/or a control logic implemented thereby incorporates at least the inputs of source water flow rate, particle charge (e.g. as measured by a zeta potential analyzer or streaming current analyzer), source water pH, source water temperature, at least one metric of organic contaminant content (e.g. TOC, UV254, and/or SUVA), and alkalinity; in some embodiments, a further input of the measured turbidity of the source water may be used by the system and/or control logic as a reference value for comparison against the particle charge value. The chemical dosing system and/or control logic implemented thereby will take into account the water-temperature adjusted "optimal" pH values for a particular coagulant in an "enhanced" coagulation scheme, which the present inventor has found to be, by way of non-limiting examples, about pH 7.43 at 0.5° C. and about pH 6.30 at 30° C. for aluminum sulfate, about pH 7.55 at 0.5° C. and about pH 6.37 at 30° C. for polyaluminum chloride, about pH 7.96 at 0.5° C. and about pH 6.80 at 30° C. for aluminum chlorhydrate, and about pH 6.52 at 0.5° C. and about pH 5.27 at 30° C. for ferric chloride and/or ferric sulfate. In these embodiments, a pH PID loop maintains the "optimal" pH setpoint for a preselected coagulant by controlled dosing of acid and/or base into the source water, and can make dynamic, real-time adjustments to the pH setpoint based on fluctuations in source water temperature. Simultaneously, a second PID loop (hereinafter the "particle charge PID loop") also maintains an "optimized" particle charge (e.g. zeta potential or streaming current) setpoint by controlled dosing of coagulant, and a third PID loop (hereinafter the "organics PID loop") regulates a further dosing of coagulant to achieve an optimal or selected extent of removal of soluble organic contaminants. Another PID loop can then be used as a "trimming" control to optimize floc agglomeration by further acid or base dosing; this PID loop may be the same as, or incorporated into, the pH PID loop, or may be a separate, fourth, PID loop.

In embodiments of the present disclosure, the chemical dosing system or control logic thereof may take into account additional inputs, such as ion saturation measurements (e.g. total dissolved solids and/or alkalinity-as-$CaCO_3$), electrical conductivity, and the like, which may shift the desired pH setpoint, and/or broaden or tighten the acceptable deviation from the optimal pH setpoint, for a particular coagulant. By way of non-limiting examples, the present inventor has found that for highly ion-saturated source water streams, "optimal" pH values may be shifted to about pH 7.8 at 5° C. and about pH 6.8 at 20° C. for aluminum sulfate, about pH 8.0 at 5° C. and about pH 7.0 at 20° C. for polyaluminum chloride, about pH 8.3 at 5° C. and about pH 7.3 at 20° C. for aluminum chlorhydrate, and about pH 7.3 at 5° C. and about pH 6.3 at 20° C. for ferric chloride and/or ferric sulfate.

In "enhanced" coagulation embodiments of the present disclosure, the chemical dosing system or control logic thereof calculates an optimized pH value or range for a particular coagulant, taking into account at least water temperature and total dissolved solids content, and doses an acid and/or base to achieve the lowest pH value at which the coagulant can achieve a desired degree of soluble organic removal. This control scheme may be suitable, for example, in applications in which it is desirable (for reasons of cost, regulatory compliance, or the like) to limit the coagulant demand of the water treatment process to the lowest level possible.

In embodiments of the present disclosure, the chemical dosing system or control logic thereof can monitor the organics content of the source water to determine whether the source water meets regulatory limits for organic contaminants, and switch, dynamically and in real time, between a "standard" coagulation control mode and an "enhanced" coagulation control mode. In some such embodiments, the chemical dosing system or control logic thereof may consider a distribution system detention time parameter, which may, for example, be calculated or estimated by measuring clear well temperature and/or storage tank drawdown rate, each of which relates to the predicted formation of disinfection byproducts (DBPs); the chemical dosing system or control logic thereof can thus switch between "standard" and "enhanced" coagulation modes based on predicted compliance with regulatory limits on TOC or DBP content. In some embodiments, the chemical dosing system or control logic thereof can automatically reset or adjust a coagulant dosing "trim" value when switching between "standard" and "enhanced" coagulation modes, as coagulant requirements generally differ considerably between these modes.

In embodiments of the present disclosure, the chemical dosing system or control logic thereof calculates an optimized pH value or range for a particular coagulant, taking into account at least water temperature, and doses an acid and/or base to achieve the lowest pH value at which a desired extent of precipitated floc formation can be achieved. This control scheme may be suitable, for example, in applications in which it is desirable (for reasons of cost, regulatory compliance, or the like) to limit the coagulant demand of the water treatment process to the lowest level possible.

Embodiments of the present disclosure incorporate a chemical molar calculator into the chemical dosing system or control logic thereof. The chemical molar calculator may automatically update any one or more ion saturation indices (e.g. Langelier, calcium carbonate precipitation potential (CCPP), Stiff-Davis, Ryznar, Larson, etc.) to monitor the potential for corrosion based on coagulant dosing. The chemical molar calculator may automatically compare readings from multiple separate pH analyzers at different points in the water treatment process (for example, pH of the "raw" influent water, in a rapid mix tank, and in an exit stream or clear well) as a check for accuracy. Alternatively, the chemical molar calculator may base its calculations on readings from a single pH or temperature probe (thereby eliminating the need for additional such probes); by way of non-limiting example, the chemical molar calculator may use a single measurement of the pH of the "raw" (input) water to estimate the post-coagulation (or other chemical addition) pH of the water, or vice versa. Chemical molar calculation in the systems and methods of the disclosure can compensate for the dosing of all chemicals within the treatment systems that may affect pH (coagulant, disinfectant, acid/base for pH adjustment, soda ash, lime, etc.), not merely those that are controlled by the automated dosing system/method.

In embodiments of the present disclosure, ion saturation calculations may be updated in real time based on changes in the dosing of coagulant, acid/base, or any other chemical addition that alters ion saturation values, as well as water quality parameters such as pH, hardness, alkalinity, sulfate content, chloride content, total dissolved solids, temperature, and the like. This real-time updating of ion saturation values can provide important corrosion monitoring capability, particularly in response to sudden changes in water quality (e.g. a snowmelt or rain event). The parameter values used as inputs to any known saturation index calculation (Langelier, Ryznar, etc.) can be sent to a control computer automatically by in-line analyzers/sensors interconnected to the control computer, or may be manually input by an operator or technician (e.g. where a sample of process water is taken for off-line laboratory testing), or a combination of these. In some embodiments, values of one or more selected indices may be displayed in a graphical user interface or similar, and the control computer may provide a visual and/or auditory alarm when an ion saturation index exceeds a preset value that indicates the presence, or an increased risk, of corrosion; the preset value may be manually set by an operator or technician, or may be automatically and/or dynamically determined by a control logic of the automated chemical dosing method or system. In some embodiments, chemical molar calculations may determine post-dosing pH and alkalinity of the treated water; predetermined levels of sulfate and chloride, which may depend on the type of coagulant used, can be used to update these analytical values.

In embodiments of the present disclosure, analyzers/sensors and chemical dosing devices may be configured or positioned according to a spatial organization scheme that allows for optimal multi-parameter PID loop control to minimize interference between separate PIDs. Particularly, spatially separating pH control elements (e.g. pH sensors, devices for introducing acid or base into the process water) from zeta potential control elements (e.g. zeta potential sensors, devices for introducing coagulant into the process water) may reduce the risk of the PID loops controlling these respective elements from "fighting" each other, especially where the pH control raises the pH by introducing a base and the zeta potential control lowers the pH by introducing an acidic coagulant. Typically (but not necessarily), zeta potential control elements are placed downstream of pH control elements, and, in "enhanced" coagulation embodiments, organic content control elements (e.g. organic contaminant sensors, devices for introducing additional doses of coagulant to achieve enhanced coagulation) are placed downstream of zeta potential control elements. An example of a chemical dosing system configured according to this type of spatial organization scheme is illustrated in further detail in FIG. 6.

In embodiments of the present disclosure, the chemical dosing system or control logic thereof may monitor the turbidity of the process water as a "check" or "guide" of the accuracy of particle charge measurements and achievement of a particle charge setpoint. The chemical dosing system or control logic thereof may provide an auditory or visual alert to an operator or technician when the turbidity exceeds (or falls below) a preselected limit.

In some embodiments of the present disclosure, any one or more PID loops of the chemical dosing system or a control logic thereof may determine the optimal setpoint or range of the relevant parameter (pH, zeta potential, etc.) and/or the dose of chemical (acid, base, coagulant, etc.) needed to achieve the setpoint or range according to a deterministic equation in which the various input variables are used as weights, coefficients, or the like. Additionally or alternatively, any one or more PID loops of the chemical dosing system may determine the optimal setpoint or range of the relevant parameter and/or the dose of chemical needed to achieve the setpoint or range by use of a lookup table stored in a computer memory; by way of non-limiting example, a computer memory may contain a lookup table specific to a particular coagulant (for example, aluminum chlorhydrate) that correlates water temperature with the optimized pH setpoint or range for standard or enhanced coagulation using the coagulant, and the PID loop or control logic thereof may look up the optimized pH setpoint or range based on a water temperature measurement received from a water temperature sensor. Additionally or alternatively, any one or more PID loops of the chemical dosing system or a control logic thereof may determine the optimal setpoint of the relevant parameter and/or the dose of chemical needed to achieve the setpoint by employing any one or more machine learning algorithms, using historical water treatment input variables and treatment outcomes as training data to construct equations and/or weight input variables in an iterative manner, which may enable more complex, complete, and/or nuanced relationships between input variables and water treatment outcomes. Machine learning algorithms employed by the PID loop or control logic thereof may be either supervised or unsupervised and may include, by way of non-limiting example, TensorFlow, NaiveBayes, Logistic Regression, and Random Forest. Machine learning algorithms may allow for chemical dosing to be more readily adjusted dynamically and in real time in response to source water variability (e.g. spikes in turbidity subsequent to storm events), and/or to be optimized for disinfectant dose, corrosion control, DBP formation, or the like, based on historical performance trends. The machine learning algorithm may impose limits on coagulant and/or acid/base dosing to prevent overdosing based on historical data (e.g. turbidity, pH, temperature, etc.) and chemical dosing profile (e.g. coagulant, polymer, pH adjustment, etc.).

In some embodiments of the present disclosure, any one or more PID loops of the chemical dosing system or a control logic thereof may incorporate a delay feature, i.e. take into account the fact that increases or decreases in chemical dosing require some period of time to take effect. By way of non-limiting example, a pH control PID loop may implement a delay feature to allow the pH of the process water to readjust based on a change in acid or base dosing before making a subsequent change in acid or base dosing, and/or a particle charge PID loop may implement a delay feature to allow a zeta potential and/or streaming current of the process water to readjust based on a change in coagulant dosing before making a subsequent change in coagulant dosing. Additionally or alternatively, the control logic, upon initial startup, may incorporate a delay (e.g. about 15 minutes) after acid/base dosing begins to allow the pH of the process water to stabilize before initiating zeta potential-controlled automated coagulant dosing. These delay features may allow for more exact setpoint control and more efficient use of added chemicals by addressing the "lag" between a change in dosing and a change in the relevant process water parameter.

The present inventor has surprisingly, unexpectedly, and advantageously discovered that (1) the pH range within which a water treatment coagulant is optimally insoluble is not necessarily equal to the pH range within which floc quality is ideal; (2) alkalinity changes in the source water will "broaden" or "narrow" the pH range for optimal floc precipitation and agglomeration; and (3) the relationship between optimal pH and water temperature is not linear, but rather that the optimal pH is more sensitive to temperature fluctuations at higher temperatures. The present inventor has made the further surprising, unexpected, and advantageous discovery of the optimal pH based on water temperature, in the temperature range between 0.5° C. and 30° C., for four commonly used coagulants, which are described in greater detail in the description that follows and in FIGS. 8A through 8D. Thus, in embodiments, the present disclosure provides automated chemical dosing systems and methods that automatically "shift" the target pH setpoint or range based on changing water temperature, thus ensuring continually optimized coagulant performance. In embodiments of these systems and methods, a proportional-integral-derivative (PID) loop controller, or other similar operating software, provides pH control by dosing an acid or base into the process water to maintain an optimal pH setpoint or range; as the water temperature fluctuates, the PID loop controller recalculates the acid or base dosing necessary to maintain the shifted pH target. In a typical embodiment, a chemical coagulant and a pH adjustment agent (acid or base) are added to a rapid mix tank and mixed by a mechanical agitator; a sample of the water is measured for pH and temperature, and a PID loop controller monitors the pH and temperature and sends a continuous signal to an acid or base dosing pump to speed up or slow down to maintain the optimal water temperature-compensated pH value. Additional PID loops may work independently to control coagulant dosing to optimize, by way of non-limiting example, precipitated floc quality for turbidity reduction and improved settling times in a clarifier or separation in a flotation unit.

The present inventor also surprisingly, unexpectedly, and advantageously discovered, in relation to water treatment processes that co-dose organic polymer with the coagulant to assist with agglomeration of floc particles into floc masses and sweep up additional colloidal particles, that (1) the relationship between optimal polymer dose and coagulant dose is not linear, (2) the optimal polymer dose depends on variations in coagulant dose relative to the zeta potential of the process water, (3) zeta potential control of coagulant dose alone cannot accommodate simultaneous polymer dosing, and (4) alignment of polymer dosing factors with a coagulant dosing range can determine the optimal polymer dose. Thus, in embodiments, the present disclosure provides automated chemical dosing systems and methods in which a predetermined zeta potential change factor related to a coagulant dosing range is utilized to determine the appropriate dose of polymer; for example, where the predetermined factor is 0.75 (which may be the case, by way of non-limiting example, when a coagulant dosing concentration changes from 10 ppm to 20 ppm), a change in the polymer dosing may be 0.75 times the change in the coagulant dosing. In embodiments of these systems and methods, a PID loop controller, or other similar operating software, provides automated polymer flocculant dosing based on the charge demand related to a range of coagulant doses; polymer dosing is determined based on opposing particle charge demand and is not necessarily linearly dependent on coagulant dose, thereby allowing a predetermined range of particle charge values (e.g. zeta potential and/or streaming current values) to align with the polymer dosing amounts needed to achieve optimal flocculation.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s)

or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. In additional embodiments, the disclosed methods may be implemented in conjunction with functional programming. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

FIG. 1 is a block diagram illustrating elements of an exemplary computing device in which embodiments of the present disclosure may be implemented. More specifically, this example illustrates one embodiment of a computer system 100 upon which the servers, user computers, computing devices, or other systems or components described above may be deployed or executed. The computer system 100 is shown comprising hardware elements that may be electrically coupled via a bus 104. The hardware elements may include one or more Central Processing Units (CPUs) 108, which may in embodiments include any one or more programmable logic controllers (PLCs), microprocessors, or the like; one or more input devices 112, which may in embodiments include one or more user input devices (e.g., a mouse, a keyboard, etc.) and/or one or more sensors or analyzers (e.g. a flow rate sensor, a turbidity sensor, a pH sensor, a temperature sensor, an organics sensor, etc.); and one or more output devices 116, which may in embodiments include one or more devices for outputting information in a manner intelligible by a human technician (e.g., a display device, a printer, etc.) and/or one or more output devices or signals that may command and/or control components of a water treatment process (e.g. chemical dosing pumps, delay features, speed controls, proportional-integral-derivative (PID) controllers, and the like). The computer system 100 may also include one or more storage devices 120. By way of example, storage device(s) 120 may be disk drives, optical storage devices, solid-state storage devices such as a Random-Access Memory (RAM) and/or a Read-Only Memory (ROM), which can be programmable, flash-updateable and/or the like.

The computer system 100 may additionally include a computer-readable storage media reader 124; a communications system 128 (e.g., a modem, a network card (wireless or wired), an infra-red communication device, etc.); and working memory 136, which may include RAM and ROM devices as described above. The computer system 100 may also include a processing acceleration unit 132, which can include a Digital Signal Processor (DSP), a special-purpose processor, and/or the like.

The computer-readable storage media reader 124 can further be connected to a computer-readable storage medium, together (and, optionally, in combination with storage device(s) 120) comprehensively representing remote, local, fixed, and/or removable storage devices plus storage media for temporarily and/or more permanently containing computer-readable information. The communications system 128 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 100 may also comprise software elements, shown as being currently located within a working memory 136, including an operating system 140, a chemical molar calculator 144, a machine learning algorithm 148, and/or other code or programs 152. It should be appreciated that alternate embodiments of a computer system 100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 108 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Examples of the programmable logic controllers 108 as described herein may include, but are not limited to, at least one of an Allen-Bradley programmable logic controller, a Siemens programmable logic controller, other industry-equivalent programmable logic controllers, and may perform computational functions using any known or future-developed standard, instruction set, libraries, and/or architecture. In the practice of embodiments of the present disclosure, programmable logic controllers may utilize any suitable software language, such as Ladder Logic, Ladder Diagram, or any other similar industrial software programming language.

Figure 2:
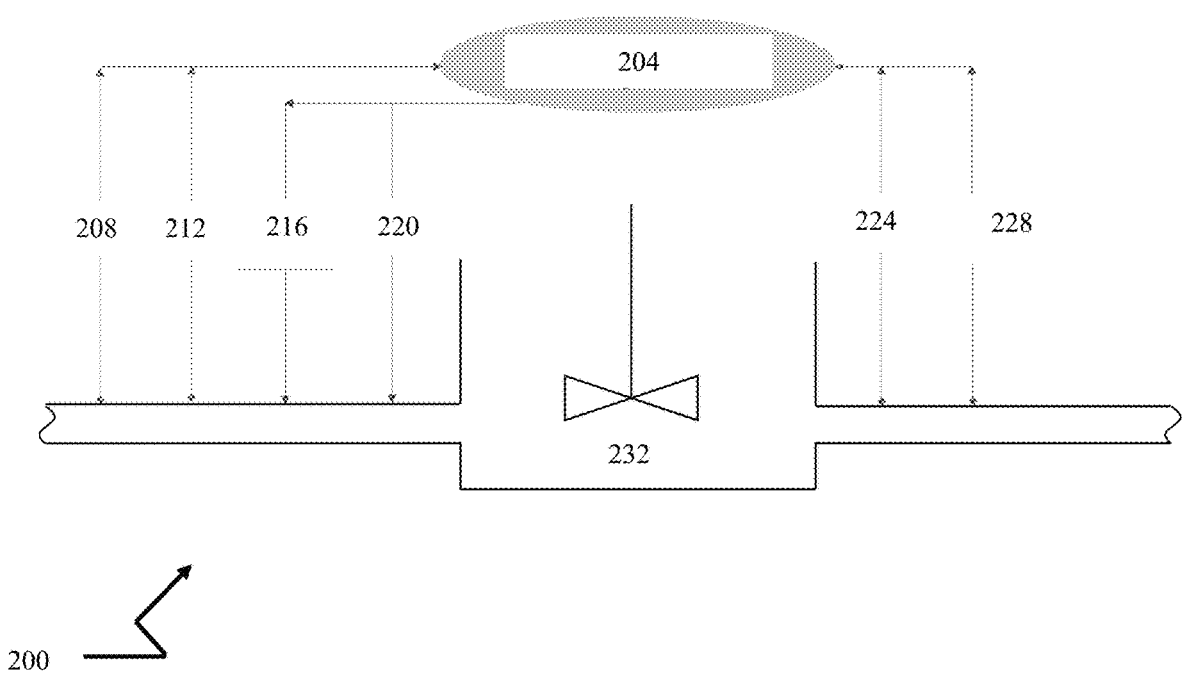
FIG. 2 is a schematic illustrating main components of a feedback loop control system for coagulation in a water treatment process, according to embodiments of the present disclosure.

Referring now to FIG. 2, an automated chemical dosing system 200 according to the present disclosure may be used to implement a "standard" coagulation water treatment process. As shown in FIG. 2, the automated chemical dosing system 200 comprises a computer 204 that controls a coagulant dosing device 216 and an acid/base dosing device 220. The computer 204 receives data from a flow meter 212 and (optionally) an alkalinity sensor 208 upstream of the coagulant dosing device 216 and acid/base dosing device 220, and further receives data from pH and temperature sensor(s) 224 and a particle charge sensor 228 (which may be either or both of a zeta potential sensor and a streaming current sensor) downstream of coagulant dosing device 216 and acid/base dosing device 220. Based on the data received from the flow meter 212, the pH and temperature sensor(s) 224, and the particle charge sensor 228, and optionally the alkalinity sensor 204, the computer 204 determines an optimized water temperature-compensated pH setpoint or range, an optimized particle charge setpoint or range, and the required doses of acid and/or base and coagulant needed to achieve these respective setpoints or ranges and commands the coagulant dosing device 216 and acid/base dosing device 220 to introduce the required doses of coagulant and acid/base into the process water. Optionally, the automated chemical dosing system 200 may further comprise an impeller 232 or similar rapid mixing device to facilitate rapid and thorough mixing of coagulant introduced by the coagulant dosing device 216 and/or acid or base introduced by the acid/base dosing device 220 in the process water; operation of the impeller 232 or similar rapid mixing device may, but need not, be controlled by the computer 204. The optimized water temperature-compensated pH setpoint or range will be specific to the coagulant used (which an operator or technician may specify) and may vary based on alkalinity changes in the source water, which may be monitored by the computer 204 based on input from the optional alkalinity sensor 208. Because the pH and temperature sensor(s) 224 and particle charge sensor 228 are downstream of coagulant and acid/base addition, the computer 204 can determine whether the doses of coagulant and acid/base are achieving the determined setpoints or ranges and command the coagulant dosing device 216 and acid/base dosing device 220 to increase, decrease, or maintain, as needed, the amount of chemical being added to the process water. (While FIG. 2 illustrates the pH and temperature sensor(s) 224 and particle charge sensor 228 as located in a stream exiting from a rapid mix tank of the water treatment process, it is to be expressly understood that these sensors may alternatively be located within the rapid mix tank itself, or in any other suitable position downstream of coagulant dosing device 216 and acid/base dosing device 220.) The automated chemical dosing system 200 may include other features that are not illustrated in FIG. 2, such as, by way of non-limiting example, one or more delay timers and/or sensors for monitoring the turbidity of the process water.

Figure 3:
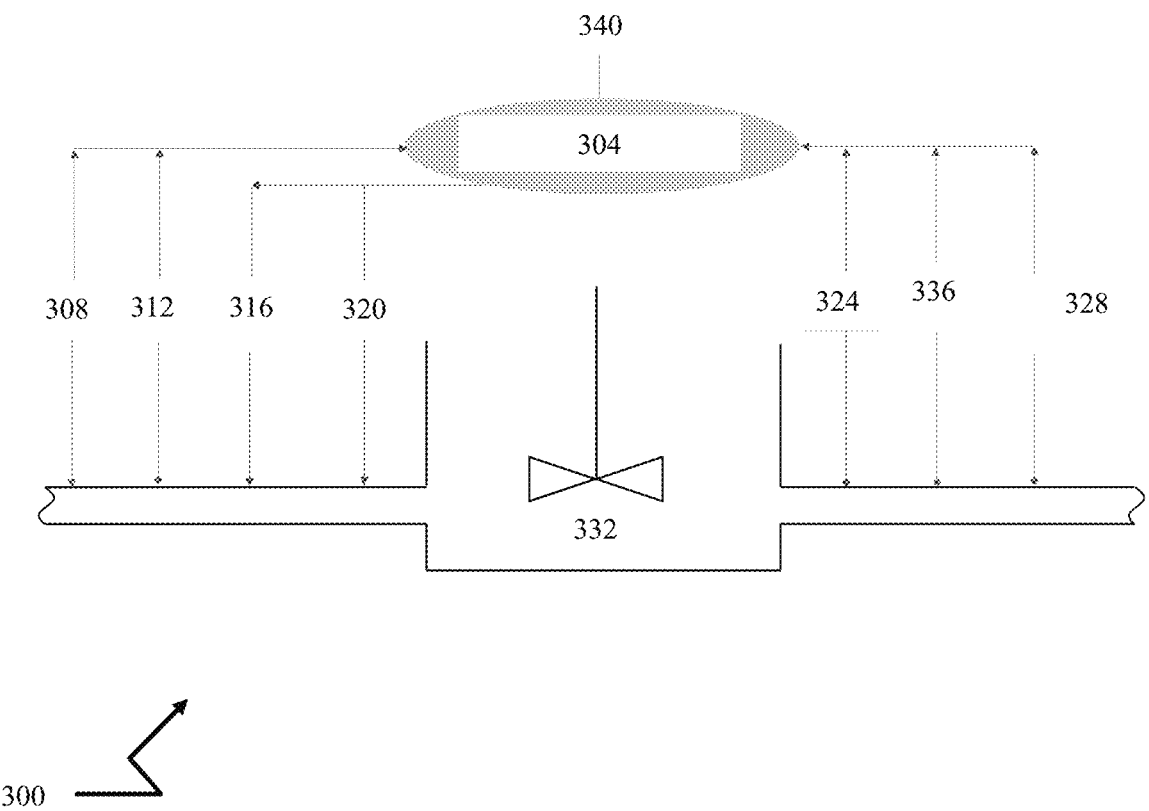
FIG. 3 is a schematic illustrating main components of a feedback loop control system for enhanced coagulation in a water treatment process, according to embodiments of the present disclosure.

Referring now to FIG. 3, an automated chemical dosing system 300 according to the present disclosure may be used to implement an "enhanced" coagulation water treatment process. As shown in FIG. 3, the automated chemical dosing system 300 comprises a computer 304 that controls a coagulant dosing device 316 and an acid/base dosing device 320. The computer 304 receives data from an alkalinity sensor 308 and a flow meter 312 upstream of the coagulant dosing device 316 and acid/base dosing device 320, and further receives data from pH and temperature sensor(s) 324, a particle charge sensor 328 (which may be either or both of a zeta potential sensor and a streaming current sensor), and an organics sensor 336 (which may be any one or more of a TOC sensor, a UV254 sensor, and a SUVA sensor) downstream of coagulant dosing device 316 and acid/base dosing device 320. Based on the data received from the alkalinity sensor 308, the flow meter 312, the pH and temperature sensor(s) 324, the particle charge sensor 328, and the organics sensor 336, the computer 304 determines an optimized water temperature-compensated pH setpoint or range, an optimized particle charge setpoint or range, an optimized organic content setpoint or range, and the required doses of acid and/or base and coagulant needed to achieve these respective setpoints or ranges and commands the coagulant dosing device 316 and acid/base dosing device 320 to introduce the required doses of coagulant and acid/base into the process water. Optionally, the automated chemical dosing system 300 may further comprise an impeller 332 or similar rapid mixing device to facilitate rapid and thorough mixing of coagulant introduced by the coagulant dosing device 316 and/or acid or base introduced by the acid/base dosing device 320 in the process water; operation of the impeller 332 or similar rapid mixing device may, but need not, be controlled by the computer 304. The optimized water temperature-compensated pH setpoint or range will be specific to the coagulant used (which an operator or technician may specify) and may vary based on alkalinity changes in the source water, which may be monitored by the computer 304 based on input from the alkalinity sensor 308. Because the pH and temperature sensor(s) 324, particle charge sensor 328, and organics sensor 336 are downstream of coagulant and acid/base addition, the computer 304 can determine whether the doses of coagulant and acid/base are achieving the determined setpoints or ranges and command the coagulant dosing device 316 and acid/base dosing device 320 to increase, decrease, or maintain, as needed, the amount of chemical being added to the process water. (While FIG. 3 illustrates the pH and temperature sensor(s) 324, particle charge sensor 328, and organics sensor 336 as located in a stream exiting from a rapid mix tank of the water treatment process, it is to be expressly understood that these sensors may alternatively be located within the rapid mix tank itself, or in any other suitable position downstream of coagulant dosing device 316 and acid/base dosing device 320.) The automated chemical dosing system 300 may include other features that are not illustrated in FIG. 3, such as, by way of non-limiting example, one or more delay timers and/or sensors for monitoring the turbidity of the process water. In some embodiments, the computer 304 may enable a user to switch, or be capable of automatically or dynamically switching (e.g. based on observed water quality factors such as pH, temperature, organics content, and so on), between an "enhanced" coagulation control mode and a "standard" coagulation control mode as described elsewhere throughout the disclosure. Optionally, the computer 304 may include additional functionality, such as a CSMR or DBP calculator 340, which may further inform the computer 304's control of coagulant dosing device 316 and/or acid/base dosing device 320.

Figure 4:
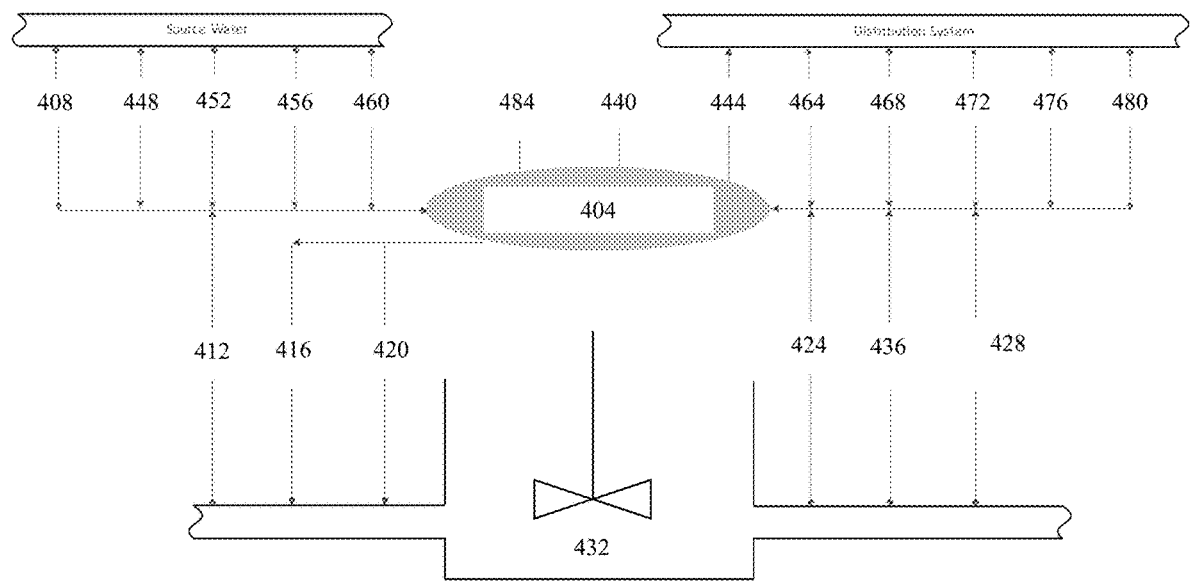
FIG. 4 is a schematic illustrating main components of a feedback loop control system for "total system" chemical dosing in a water treatment process, according to embodiments of the present disclosure.
Figure 4:
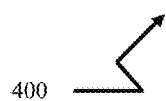

Referring now to FIG. 4, an automated chemical dosing system 400 according to the present disclosure may be used to implement a "total system" water treatment process that includes coagulation (standard or enhanced) as well as monitoring and control of corrosion and disinfection. As shown in FIG. 3, the automated chemical dosing system 400 comprises a computer 404 that controls a coagulant dosing device 416, an acid/base dosing device 420, and a chlorine dosing device 444. The computer 404 receives data from an alkalinity sensor 408, a flow meter 412, a turbidity sensor 448, an iron and/or manganese content sensor 452, a first organics sensor 456 (which may be either or both of a TOC sensor and a UV254 sensor), and first pH and temperature sensor(s) 460 upstream of the coagulant dosing device 416 and acid/base dosing device 420, further receives data from second pH and temperature sensor(s) 424, a particle charge sensor 428 (which may be either or both of a zeta potential sensor and a streaming current sensor), and a second organics sensor 436 (which may be any one or more of a TOC sensor, a UV254 sensor, and a SUVA sensor) downstream of coagulant dosing device 316 and acid/base dosing device 320, and still further receives data from third pH and temperature sensor(s) 464, a chloride sensor 468, a sulfate sensor 472, a third organics sensor 476 (which may be either or both of a TOC sensor and a UV254 sensor), and a chlorine sensor 480 downstream of the chlorine dosing device 444. Based on the data received from the alkalinity sensor 408, the flow meter 412, first, second, and third pH and temperature sensors 460,424,464, the particle charge sensor 428, first, second, and third organics sensors 456,436,476, the turbidity sensor 448, the iron and/or manganese content sensor 452, the chloride sensor 468, the sulfate sensor 472, and the chlorine sensor 480, the computer 304 determines an optimized water temperature-compensated pH setpoint or range, an optimized particle charge setpoint or range, an optimized organic content setpoint or range, an optimized disinfection setpoint or range, and the required doses of acid and/or base, coagulant, and chlorine needed to achieve these respective setpoints or ranges and commands the coagulant dosing device 416, acid/base dosing device 420, and chlorine dosing device 444 to introduce the required doses of coagulant, acid/base, and chlorine into the process water. Optionally, the automated chemical dosing system 400 may further comprise an impeller 432 or similar rapid mixing device to facilitate rapid and thorough mixing of coagulant introduced by the coagulant dosing device 416 and/or acid or base introduced by the acid/base dosing device 420 in the process water; operation of the impeller 432 or similar rapid mixing device may, but need not, be controlled by the computer 404. The optimized water temperature-compensated pH setpoint or range will be specific to the coagulant used (which an operator or technician may specify) and may vary based on alkalinity changes in the source water, which may be monitored by the computer 404 based on input from the alkalinity sensor 408. Because the second pH and temperature sensor(s) 424, particle charge sensor 428, and second organics sensor 436 are downstream of coagulant and acid/base addition, the computer 404 can determine whether the doses of coagulant and acid/base are achieving the determined setpoints or ranges and command the coagulant dosing device 416 and acid/base dosing device 420 to increase, decrease, or maintain, as needed, the amount of chemical being added to the process water. (While FIG. 4 illustrates the second pH and temperature sensor(s) 424, particle charge sensor 428, and second organics sensor 436 as located in a stream exiting from a rapid mix tank of the water treatment process, it is to be expressly understood that these sensors may alternatively be located within the rapid mix tank itself, or in any other suitable position downstream of coagulant dosing device 416 and acid/base dosing device 420.) Similarly, because the third pH and temperature sensors 464, chloride sensor 468, sulfate sensor 472, third organics sensor 476, and chlorine sensor 480 are downstream of chlorine addition, the computer 404 can determine whether the dose of chlorine is achieving the determined disinfection setpoints or ranges and command the chlorine dosing device 444 to increase, decrease, or maintain, as needed, the amount of chlorine being added to the process water. The automated chemical dosing system 400 may include other features that are not illustrated in FIG. 4, such as, by way of non-limiting example, one or more delay timers. In some embodiments, the computer 404 may enable a user to switch, or be capable of automatically or dynamically switching (e.g. based on observed water quality factors such as pH, temperature, organics content, and so on), between an "enhanced" coagulation control mode and a "standard" coagulation control mode as described elsewhere throughout the disclosure and/or to enable or disable the corrosion and disinfection control features (e.g. the chlorine dosing device 444 and sensors downstream thereof). The computer 404 includes functions such as a CSMR and/or DBP calculator 440 and one or more other chemical molar calculators 484, which further inform the computer 404's control of coagulant dosing device 416 and/or acid/base dosing device 420. Optionally, the computer 404 may include additional functionality, such as calculators for content of haloacetic acids (HAA) and/or total trihalomethanes (TTHM), which relate to ion saturation index monitoring and corrosion mitigation.

Figure 5:
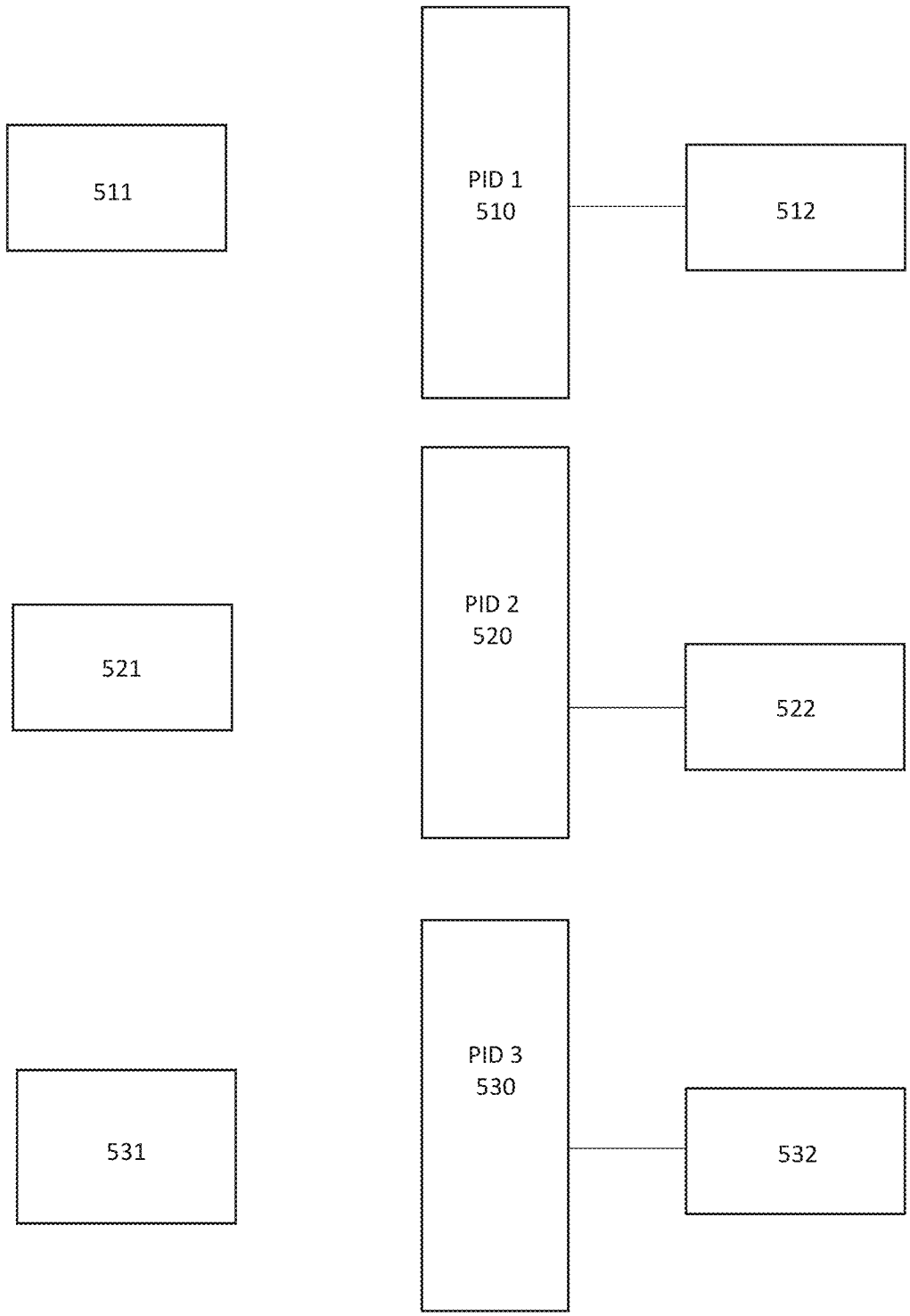
FIG. 5 is a schematic illustrating main components of two proportional-integral-derivative (PID) loop controllers, according to embodiments of the present disclosure.

Referring now to FIG. 5, main components of PID loop controllers, as may be implemented, by way of non-limiting example, in automated chemical dosing systems 200,300, 400 and particularly computers 204,304,404 thereof, are illustrated. In the embodiment illustrated in FIG. 5, a first PID loop controller 510 receives inputs of pH and water temperature, and optionally other inputs such as total dissolved solids content, from first sensor group 511, processes these data as described herein to determine a target pH setpoint or range, and regulates an acid or base dosing pump 512 to maintain this setpoint or range. A second PID loop controller 520 receives at least one input relating to a particle charge (e.g. zeta potential or streaming current measurement) from second sensor group 521, processes these data as described herein to determine a target particle charge setpoint or range, and regulates a first coagulant dosing pump 522 to maintain this setpoint or range. Optionally, a third PID loop controller 530 receives at least one input relating to organics content in the process water (e.g. measurement of TOC, UV254, and/or SUVA), processes these data as described herein to determine a target organics content setpoint or range, and regulates a second coagulant dosing pump 532 to maintain this setpoint or range. Additional PID loop controllers may be provided as described elsewhere throughout this disclosure, for example to provide for disinfection by chlorinating or chloraminating agents, etc. In some embodiments, one or more of PID loops 510,520, 530, . . . , and/or one or more computers in which they are embodied, may include additional software that resolves conflicts or interference between any one or more of the PID loops 510,520,530, . . . .

Figure 6:
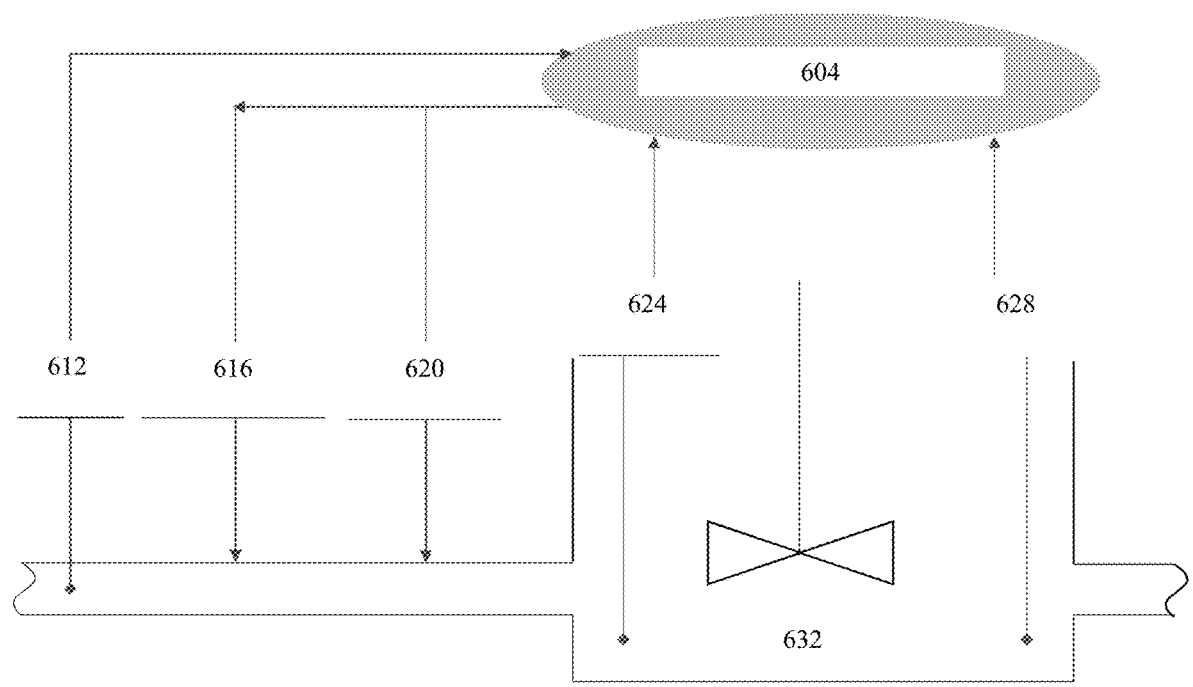
FIG. 6 is an illustration of a configuration of in-line analyzers and chemical dosing pumps for optimized automated chemical dosing control in a water treatment process, according to embodiments of the present disclosure.

Referring now to FIG. 6, a spatial organization scheme for sensors and chemical dosing pumps in a water treatment process with automated chemical dosing is illustrated. The spatial organization scheme illustrated in FIG. 6 allows for staged, separated control of multiple water treatment process variables while preventing interference between separate PID loops that may control each of these variables. As the schematic of FIG. 6 illustrates, a flow meter 612, i.e. a flow meter 212,312,412 as illustrated in FIGS. 2-4, is located upstream of a coagulant dosing device 616, i.e. a coagulant dosing device 216,316,416 as illustrated in FIGS. 2-4. The coagulant dosing device 616 is followed (in the direction of flow) by acid/base dosing device 620, i.e. an acid/base dosing device 220,320,420 as illustrated in FIGS. 2-4. In turn, pH and temperature sensor(s) 624 and particle charge sensor 628, i.e. pH and temperature sensor(s) 224,324,424 and particle charge sensors 228,328,428 as illustrated in FIGS. 2-4, are located downstream of acid/base dosing device 620. (While FIG. 6 illustrates the pH and temperature sensor(s) 624 and particle charge sensor 628 as located in a rapid mix tank of the water treatment process, it is to be expressly understood that these sensors may alternatively be placed in a stream exiting the rapid mix tank, or in any other suitable position downstream of coagulant dosing device 616 and acid/base dosing device 620. When these sensors are located within a rapid mix tank, it is preferable, though not necessary, for the sensors to receive water samples from opposite ends of the rapid mix tank.) As in FIGS. 2-4, coagulant dosing device 616 and acid/base dosing device 620, and optionally an impeller 632 (i.e. an impeller 232, 332,432 as illustrated in FIGS. 2-4), are under the control of a computer 604 (i.e. a computer 204,304,404 as illustrated in FIGS. 2-4), although, as illustrated in FIG. 5, separate PID control loops implemented by the computer 604 operate the coagulant dosing device 616 and the acid/base dosing device 620. Locating the sensors and dosing devices according to the spatial organization scheme illustrated in FIG. 6 allows for the control logic of one or more PID control loops to establish and maintain an optimal pH target setpoint or range prior to particle charge measurement, thus allowing the pH to drive or direct the necessary dose of coagulant; if pH and temperature sensor(s) 624 and particle charge sensor 628 were co-located, introduction of the coagulant by coagulant dosing device 616 and introduction of the acid/base by acid/base dosing device 620 may continually offset or "fight" each other, preventing multivariate control of both pH and particle charge setpoints. Though not illustrated in FIG. 6, automated chemical dosing systems configured according to the spatial organization scheme of FIG. 6 may include an additional sensor or analyzer for organics content (TOC, UV254, SUVA, etc.) can be spatially separated from the other components in a similar fashion and may be controlled by still a third PID control loop (e.g. the third PID control loop 530 illustrated in FIG. 5) embodied in the computer 604.

Figure 7:
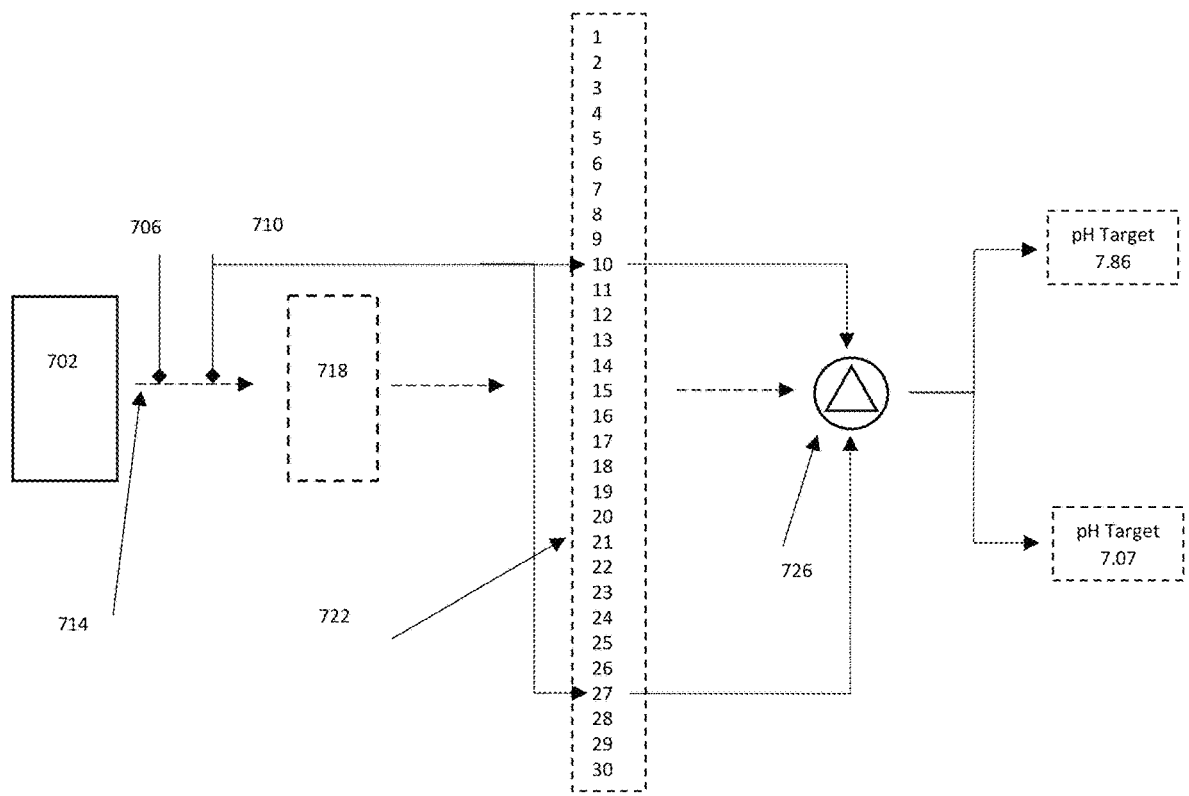
FIG. 7 is a schematic illustrating a system and control logic for automated dosing of an acid or base in a water treatment process, according to embodiments of the present disclosure.

Referring now to FIG. 7, an embodiment of a control scheme for optimized and automated dosing of an acid or base in a water treatment process is illustrated. In the control scheme illustrated in FIG. 7, a programmable logic controller 702 continually receives input from a pH sensor 706 and a temperature sensor 710 of the pH and temperature of a water stream 714 that has been treated with acid/base and coagulant. The programmable logic controller 702 passes these data to a PID device or program 718, which, upon receiving these data, utilizes a lookup table, equation, or machine learning algorithm to determine the optimal pH for a specific coagulant (which an operator or technician may have prespecified) at the measured water temperature; in this case, a lookup table 722 stored in a computer memory is used, where the lookup table 722 indicates the optimal pH for the coagulant at 1° C. increments at least between 1° C. and 30° C. As illustrated in FIG. 7, when a change in water temperature occurs—in this case, when the temperature of the process water changes from 10° C. to 27° C., or vice versa—the PID device or program 718 accordingly determines that the optimal pH has changed and sends a command to an acid/base chemical pump 726 to increase or decrease the rate of acid/base dosing to effect a change in the pH of the process water to match the determined optimal pH. In this exemplary illustration, which corresponds to the use of aluminum chlorhydrate as the coagulant, the PID device or program 718 has determined that the pH of the process water must be changed from 7.86 to 7.07 (or vice versa) based on the change in water temperature and increases or decreases the rate of acid or base dosing from acid/base chemical pump 726 accordingly.

Figure 8A:
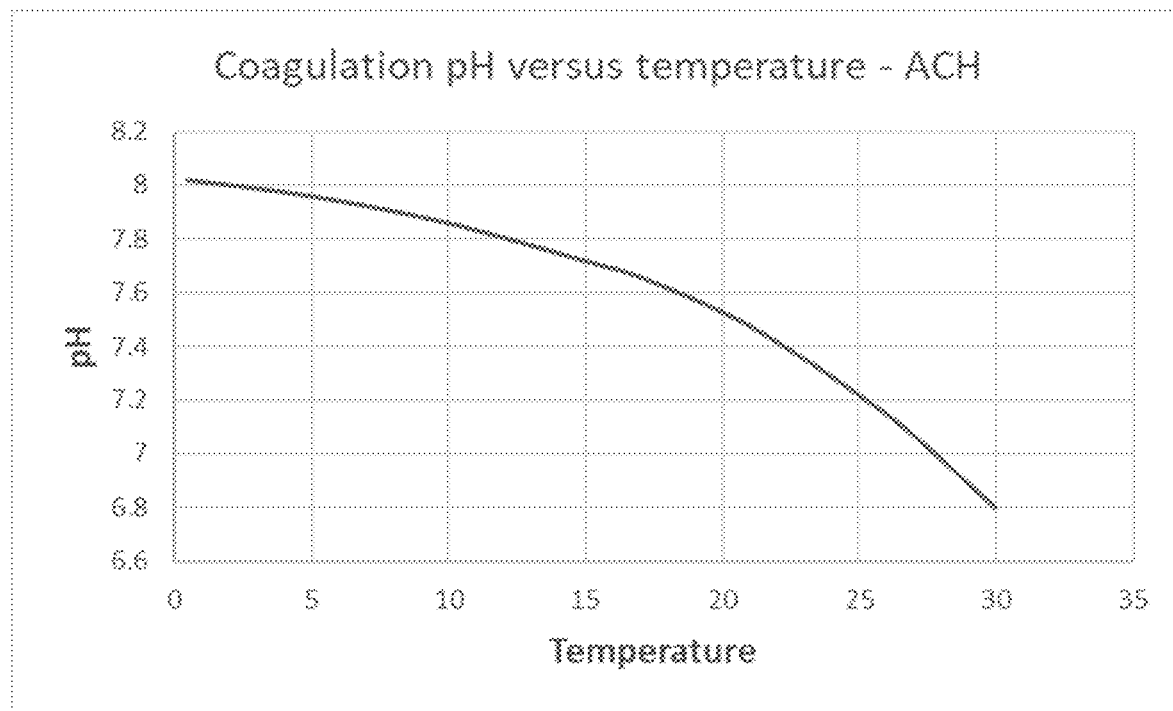
FIGS. 8A, 8B, 8C, and 8D are plots of optimal pH for floc precipitation and agglomeration versus water temperature for aluminum chlorhydrate, polyaluminum chloride, aluminum sulfate, and ferric chloride, respectively.
Figure 8B:
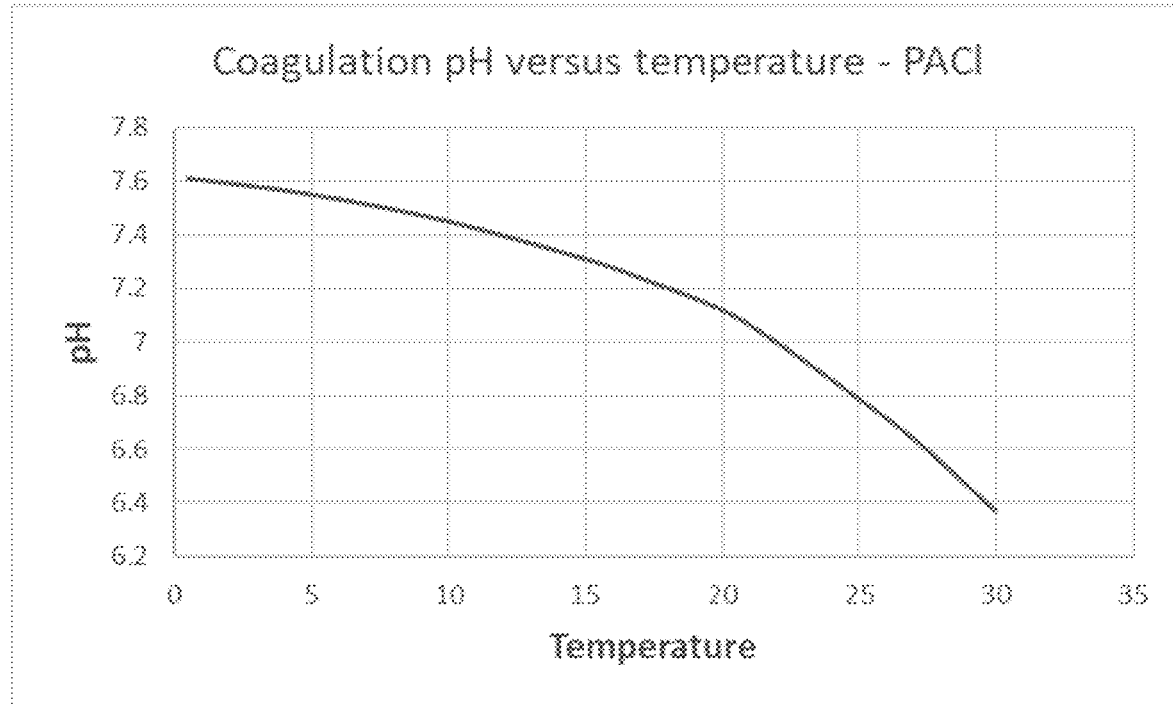
Figure 8C:
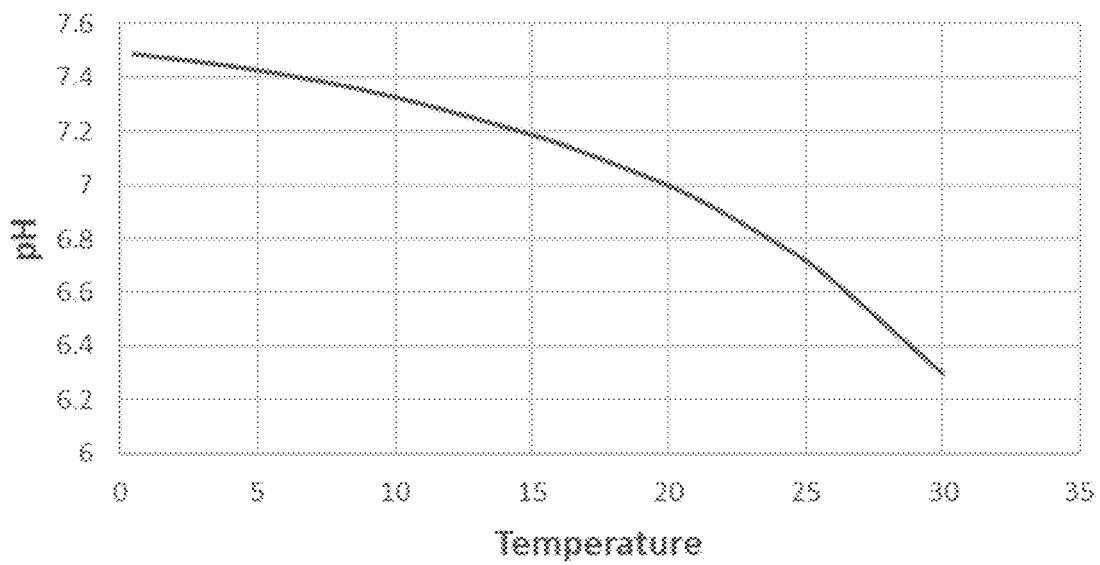
Figure 8D:
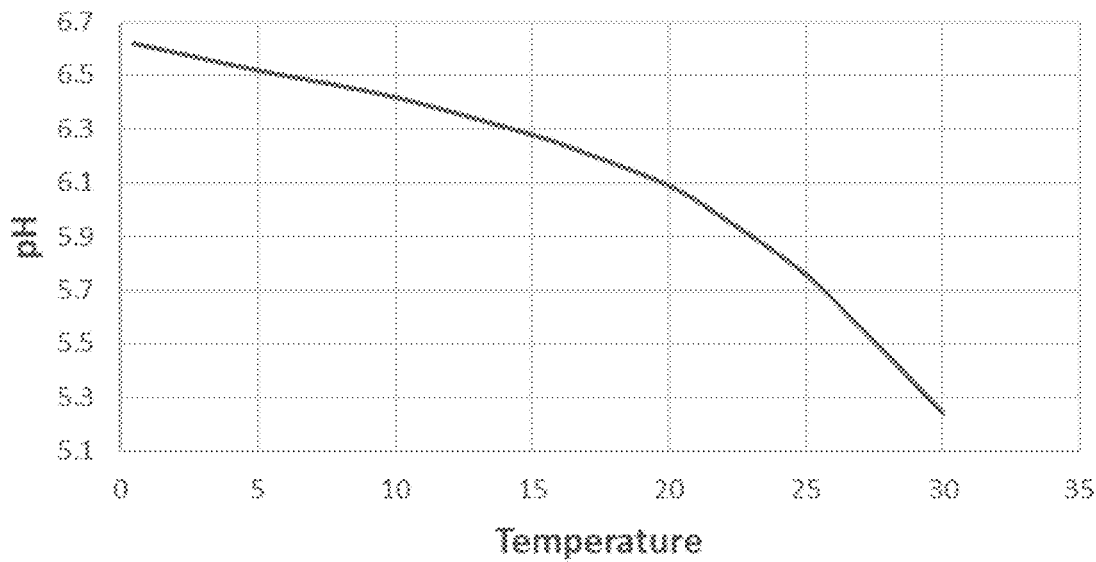

The present inventor has determined the optimal pH for floc precipitation and agglomeration at various temperatures between 0.5° C. and 30° C. for each of four coagulants commonly used in water treatment processes; these optimal pH values are given in Table 1. These values were then used to construct a curve, continuous over the temperature domain between 0.5° C. and 30° C., for each coagulant. These curves are shown in FIG. 8A (aluminum chlorhydrate, "ACH"), 8B (polyaluminum chloride, "PACl"), 8C (aluminum sulfate, "alum"), and 8D (ferric chloride, $FeCl_3$). The pH values given in Table 1 and FIGS. 8A through 8D should be considered accurate within 0.2 standard pH units, and any pH value within this degree of uncertainty may be considered "optimal" for the relevant coagulant and water temperature; thus, for example, any pH value of at least 7.82 and no more than 8.22 may be considered "optimal" for aluminum chlorhydrate at a water temperature of 0.5° C. In embodiments of the present disclosure, an automated chemical dosing system or a control logic thereof may utilize the curves of FIGS. 8A through 8D, and/or equations, algorithms, or tables of values corresponding thereto, in determining the optimal pH setpoint or range for a given coagulant based on the measured water temperature.

TABLE 1

| Water temp. | Optimal floc formation pH | | | |
|---|---|---|---|---|
| (° C.) | ACH | PACl | Alum | FeCl$_3$ |
| 0.5 | 8.02 | 7.61 | 7.49 | 6.57 |
| 5 | 7.96 | 7.55 | 7.43 | 6.52 |
| 10 | 7.86 | 7.45 | 7.33 | 6.39 |
| 15 | 7.72 | 7.31 | 7.19 | 6.27 |
| 17 | 7.66 | 7.24 | 7.12 | 6.21 |
| 20 | 7.53 | 7.12 | 7.00 | 6.10 |
| 22 | 7.42 | 7.00 | 6.90 | 5.99 |
| 25 | 7.22 | 6.79 | 6.72 | 5.77 |
| 27 | 7.07 | 6.64 | 6.56 | 5.57 |
| 30 | 6.80 | 6.37 | 6.30 | 5.27 |

Figure 9:
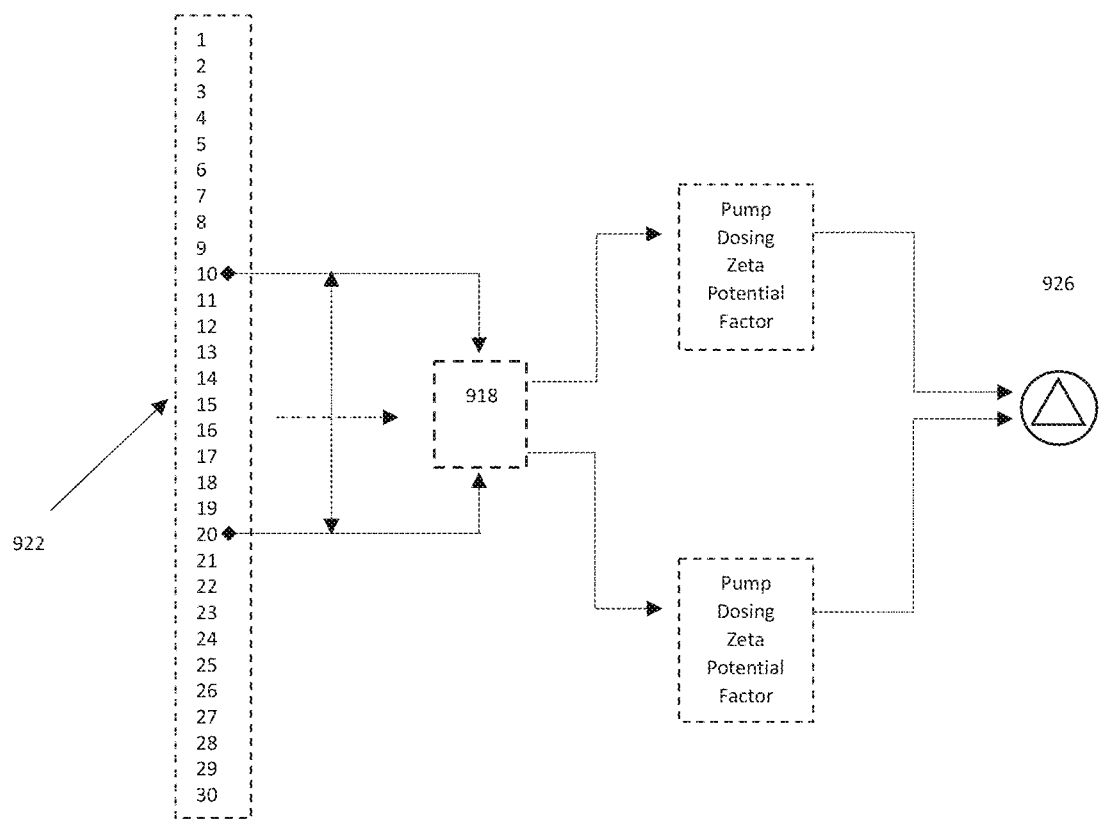
FIG. 9 is a schematic illustrating a system and control logic for automated dosing of a polymer in a water treatment process, according to embodiments of the present disclosure.

Referring now to FIG. 9, an embodiment of a control scheme for optimized and automated dosing of an organic polymer in a water treatment process is illustrated. In the control scheme illustrated in FIG. 9, a PID device or program 918 continually receives input regarding the amount of a coagulant that has been added to a process stream. Upon receiving these data, the PID device or program 918 utilizes a lookup table, equation, or machine learning algorithm to determine the optimal zeta potential based on the amount of coagulant introduced; in this case, a lookup table 922 stored in a computer memory is used, where the lookup table 922 indicates the optimal zeta potential at 1 ppm increments of coagulant concentration at least between 1 ppm and 30 ppm. As illustrated in FIG. 7, when a change in coagulant concentration occurs—in this case, when the concentration of the coagulant in the process water changes from 10 ppm to 20 ppm, or vice versa—the PID device or program 718 accordingly determines that the optimal zeta potential has changed and sends a command to a polymer dosing device 926 to increase or decrease the rate of polymer dosing to effect a change in the zeta potential of the process water to match the determined optimal zeta potential.

In embodiments of any of the automated chemical dosing methods and systems disclosed herein, it is to be expressly understood that a processor, operating system, control loop, etc. may display or report information relating to the chemical dosing regime and/or operation of the automated chemical dosing methods and/or systems in a graphical user interface of a computer, to allow a human operator or technician to verify proper functioning, correct error conditions, etc. This display/report functionality may be implemented by any suitable control system architecture, such as, by way of non-limiting example, supervisory control and data acquisition (SCADA) architectures and the like.

The concepts illustratively disclosed herein suitably may be practiced in the absence of any element which is not specifically disclosed herein. It is apparent to those skilled in the art, however, that many changes, variations, modifications, other uses, and applications of the disclosure are possible, and changes, variations, modifications, other uses, and applications which do not depart from the spirit and scope of the disclosure are deemed to be covered by the disclosure.

The foregoing discussion has been presented for purposes of illustration and description. The foregoing is not intended to limit the disclosure to the form or forms disclosed herein. In the foregoing Detailed Description, for example, various features are grouped together in one or more embodiments for the purpose of streamlining the disclosure. The features of the embodiments may be combined in alternate embodiments other than those discussed above. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment.

Moreover, though the present disclosure has included description of one or more embodiments and certain variations and modifications, other variations, combinations, and modifications are within the scope of the disclosure, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, regardless of whether such alternate, interchangeable, and/or equivalent structures, functions, ranges, or steps are disclosed herein, and without intending to publicly dedicate any patentable subject matter.

The invention claimed is:

1. An automated chemical dosing system for a water treatment process, comprising:
   a computer;
   a coagulant dosing device;
   an acid/base dosing device;
   a flow meter, positioned upstream of the coagulant dosing device and the acid/base dosing device and configured to collect data relating to a flowrate of a water stream and communicate these data to the computer;
   at least one pH and temperature sensor, positioned downstream of the coagulant dosing device and the acid/base dosing device and configured to collect data relating to the pH and temperature of the water stream and communicate these data to the computer; and
   a particle charge sensor, positioned downstream of the coagulant dosing device and the acid/base dosing device and configured to collect data relating to a particle charge parameter of the water stream and communicate these data to the computer, wherein the particle charge parameter comprises at least one of zeta potential and streaming current,
   wherein the computer comprises a processor and a non-transitory computer-readable medium storing instructions that, when executed by the processor, cause the processor to perform the steps of:
     (a) determining, in a first PID control loop and based on the data communicated to the computer, a target pH setpoint or range;
     (b) commanding, in the first PID control loop, the acid/base dosing device to increase, decrease, or maintain an acid or base dosing rate to achieve the target pH setpoint or range;
     (c) determining, in a second PID control loop and based on the data communicated to the computer, a target particle charge parameter setpoint or range;
     (d) commanding, in the second PID control loop, the coagulant dosing device to increase, decrease, or maintain a coagulant dosing rate to achieve the target particle charge parameter setpoint or range; and (e) at least one of (i) calculating a chloride to sulfate mass ratio (CSMR) and (ii) updating, based on the data communicated to the computer, at least one ion saturation index.

2. The automated chemical dosing system of claim 1, further comprising an alkalinity sensor, positioned upstream of the coagulant dosing device and the acid/base dosing device and configured to collect data relating to the alkalinity of the water stream and communicate these data to the computer.

3. The automated chemical dosing system of claim 2, further comprising an organics sensor selected from the group consisting of a TOC sensor, a UV254 sensor, and a SUVA sensor, positioned downstream of the coagulant dosing device and the acid/base dosing device, and configured to collect data relating to the organic contaminant content of the water stream and communicate these data to the computer,
wherein the instructions, when executed by the processor, cause the processor to further perform the step of determining, in a third PID control loop and based on the data communicated to the computer, a target organic content setpoint or range.

4. The automated chemical dosing system of claim 3, wherein the instructions, when executed by the processor, cause the processor to further perform the step of commanding, in the third PID control loop, the coagulant dosing device to increase, decrease, or maintain a coagulant dosing rate to achieve the target organic content setpoint or range.

5. The automated chemical dosing system of claim 3, wherein the instructions, when executed by the processor, cause the processor to further perform the steps of:
determining, in the third PID control loop, whether the target organic content setpoint or range is below an enhanced coagulation threshold; and
if the target organic content setpoint or range is below the enhanced coagulation threshold, commanding, in the third PID control loop, the coagulant dosing device to increase, decrease, or maintain a coagulant dosing rate to achieve the target organic content setpoint or range.

6. The automated chemical dosing system of claim 3, further comprising a sensor configured to collect data relating to a distribution system detention time parameter and communicate these data to the computer,
wherein the instructions, when executed by the processor, cause the processor to further perform the steps of:
calculating, in the third PID control loop and based on the data communicated to the computer, a target disinfection byproduct (DBP) content setpoint or range;
determining whether the target DBP content setpoint or range is below a DBP content threshold; and
if the target DBP content setpoint or range is below the DBP content threshold, commanding, in the third PID control loop, the coagulant dosing device to increase, decrease, or maintain a coagulant dosing rate to achieve the target DBP content setpoint or range.

7. The automated chemical dosing system of claim 3, further comprising:
a chlorine dosing device, positioned downstream of the coagulant dosing device and the acid/base dosing device; and
any one or more of:
a turbidity sensor, positioned upstream of the coagulant dosing device and the acid/base dosing device and configured to collect data relating to the turbidity of the water stream and communicate these data to the computer;
an iron and/or manganese content sensor, positioned upstream of the coagulant dosing device and the acid/base dosing device and configured to collect data relating to the iron and/or manganese content of the water stream and communicate these data to the computer;
an additional organics sensor selected from the group consisting of a TOC sensor and a UV254 sensor, positioned upstream of the coagulant dosing device and the acid/base dosing device or downstream of the chlorine dosing device, and configured to collect data relating to the organic contaminant content of the water stream and communicate these data to the computer;
at least one additional pH and temperature sensor, positioned upstream of the coagulant dosing device and the acid/base dosing device or downstream of the chlorine dosing device and configured to collect data relating to the pH and temperature of the water stream and communicate these data to the computer; and
at least one sensor positioned downstream of the chlorine dosing device and configured to collect data relating to the concentration of at least one of chloride, sulfate, and chlorine in the water stream and communicate these data to the computer,
wherein the instructions, when executed by the processor, cause the processor to further perform the steps of:
determining, in a fourth PID control loop and based on the data communicated to the computer, a target disinfection parameter setpoint or range; and
commanding, in the fourth PID control loop, the chlorine dosing device to increase, decrease, or maintain a chlorine dosing rate to achieve the target disinfection parameter setpoint or range.

8. The automated chemical dosing system of claim 1, further comprising a mixing device configured to mix into the water stream at least one of a dose of acid or base introduced by the acid/base dosing device and a dose of coagulant introduced by the coagulant dosing device.

9. The automated chemical dosing system of claim 1, wherein the instructions, when executed by the processor, cause the processor to further perform the step of calculating, based on the data communicated to the computer, a concentration of disinfection byproducts (DBP) in the water stream.

10. The automated chemical dosing system of claim 1, wherein the instructions, when executed by the processor, cause the processor to further perform the step of comparing data from a first pH sensor and data from a second pH sensor to check the accuracy of the updated ion saturation index.

11. The automated chemical dosing system of claim 1, wherein the instructions, when executed by the processor, cause the processor to further perform the step of calculating, based on the ion saturation index and a measured pH of the water stream at a first point, an estimated pH of the water stream at a second point.

12. The automated chemical dosing system of claim 1, further comprising a turbidity sensor, positioned upstream of the coagulant dosing device and the acid/base dosing device and configured to collect data relating to the turbidity of the water stream and communicate these data to the computer,
wherein the instructions, when executed by the processor, cause the processor to further perform the step of providing an auditory or visual signal via an output device of the computer when the turbidity of the water stream exceeds a predetermined threshold.

13. The automated chemical dosing system of claim 1, wherein the computer further comprises a computer memory storing a data structure corresponding to past or historical water treatment conditions and outcomes, and wherein the processor implements a machine learning algorithm based on the past or historical water treatment conditions and outcomes when performing at least one of the determining steps.

14. The automated chemical dosing system of claim 1, further comprising at least one sensor configured to collect data relating to an ion saturation parameter of the water stream and communicate these data to the computer, wherein the ion saturation parameter is at least one of alkalinity-as-calcium-carbonate and conductivity.

15. The automated chemical dosing system of claim 1, wherein the target pH setpoint or range corresponds to the lowest pH at which the target particle charge parameter setpoint or range can be achieved.

16. The automated chemical dosing system of claim 1, wherein at least one of the following is true:
   (i) the coagulant dosing device is positioned upstream of the acid/base dosing device; and
   (ii) the at least one pH and temperature sensor is positioned upstream of the particle charge sensor.

17. The automated chemical dosing system of claim 1, wherein the instructions, when executed by the processor, cause the processor to further perform the step of modifying an algorithm of at least one of the first PID control loop and a second PID control loop to prevent interference between the first and second PID control loops.

18. The automated chemical dosing system of claim 1, wherein the instructions, when executed by the processor, cause the processor to delay performing one of steps (a), (b), (c), and (d) until a predetermined time has passed since performing a different one of steps (a), (b), (c), and (d).

19. The automated chemical dosing system of claim 1, wherein the computer further comprises a computer memory storing a data structure in which a lookup table is encoded, wherein the lookup table corresponds to an optimal pH for the coagulant at each of a plurality of water temperatures, and wherein the processor performs a lookup in the lookup table when performing at least one of the determining steps.

20. The automated chemical dosing system of claim 1, wherein the coagulant comprises aluminum chlorhydrate and at least one of the following is true:
   (i) a temperature of the water stream measured by the at least one pH and temperature sensor is between about 0.5° C. and about 5° C. and the target pH setpoint or range includes at least one pH between about pH 7.96 and about pH 8.02;
   (ii) a temperature of the water stream measured by the at least one pH and temperature sensor is between about 5° C. and about 10° C. and the target pH setpoint or range includes at least one pH between about pH 7.86 and about pH 7.96;
   (iii) a temperature of the water stream measured by the at least one pH and temperature sensor is between about 10° C. and about 15° C. and the target pH setpoint or range includes at least one pH between about pH 7.72 and about pH 7.86;
   (iv) a temperature of the water stream measured by the at least one pH and temperature sensor is between about 15° C. and about 17° C. and the target pH setpoint or range includes at least one pH between about pH 7.66 and about pH 7.72;
   (v) a temperature of the water stream measured by the at least one pH and temperature sensor is between about 17° C. and about 20° C. and the target pH setpoint or range includes at least one pH between about pH 7.53 and about pH 7.66;
   (vi) a temperature of the water stream measured by the at least one pH and temperature sensor is between about 20° C. and about 22° C. and the target pH setpoint or range includes at least one pH between about pH 7.42 and about pH 7.53;
   (vii) a temperature of the water stream measured by the at least one pH and temperature sensor is between about 22° C. and about 25° C. and the target pH setpoint or range includes at least one pH between about pH 7.22 and about pH 7.42;
   (viii) a temperature of the water stream measured by the at least one pH and temperature sensor is between about 25° C. and about 27° C. and the target pH setpoint or range includes at least one pH between about pH 7.07 and about pH 7.22; and
   (ix) a temperature of the water stream measured by the at least one pH and temperature sensor is between about 27° C. and about 30° C. and the target pH setpoint or range includes at least one pH between about pH 6.80 and about pH 7.07.

21. The automated chemical dosing system of claim 1, wherein the coagulant comprises polyaluminum chloride and at least one of the following is true:
   (i) a temperature of the water stream measured by the at least one pH and temperature sensor is between about 0.5° C. and about 5° C. and the target pH setpoint or range includes at least one pH between about pH 7.55 and about pH 7.61;
   (ii) a temperature of the water stream measured by the at least one pH and temperature sensor is between about 5° C. and about 10° C. and the target pH setpoint or range includes at least one pH between about pH 7.45 and about pH 7.55;
   (iii) a temperature of the water stream measured by the at least one pH and temperature sensor is between about 10° C. and about 15° C. and the target pH setpoint or range includes at least one pH between about pH 7.31 and about pH 7.45;
   (iv) a temperature of the water stream measured by the at least one pH and temperature sensor is between about 15° C. and about 17° C. and the target pH setpoint or range includes at least one pH between about pH 7.24 and about pH 7.31;
   (v) a temperature of the water stream measured by the at least one pH and temperature sensor is between about 17° C. and about 20° C. and the target pH setpoint or range includes at least one pH between about pH 7.12 and about pH 7.24;
   (vi) a temperature of the water stream measured by the at least one pH and temperature sensor is between about 20° C. and about 22° C. and the target pH setpoint or range includes at least one pH between about pH 7.00 and about pH 7.12;
   (vii) a temperature of the water stream measured by the at least one pH and temperature sensor is between about 22° C. and about 25° C. and the target pH setpoint or range includes at least one pH between about pH 6.79 and about pH 7.00;

(viii) a temperature of the water stream measured by the at least one pH and temperature sensor is between about 25° C. and about 27° C. and the target pH setpoint or range includes at least one pH between about pH 6.64 and about pH 6.79; and (ix) a temperature of the water stream measured by the at least one pH and temperature sensor is between about 27° C. and about 30° C. and the target pH setpoint or range includes at least one pH between about pH 6.37 and about pH 6.64.

22. The automated chemical dosing system of claim 1, wherein the coagulant comprises aluminum sulfate and at least one of the following is true:

(i) a temperature of the water stream measured by the at least one pH and temperature sensor is between about 0.5° C. and about 5° C. and the target pH setpoint or range includes at least one pH between about pH 7.43 and about pH 7.49;

(ii) a temperature of the water stream measured by the at least one pH and temperature sensor is between about 5° C. and about 10° C. and the target pH setpoint or range includes at least one pH between about pH 7.33 and about pH 7.43;

(iii) a temperature of the water stream measured by the at least one pH and temperature sensor is between about 10° C. and about 15° C. and the target pH setpoint or range includes at least one pH between about pH 7.19 and about pH 7.33;

(iv) a temperature of the water stream measured by the at least one pH and temperature sensor is between about 15° C. and about 17° C. and the target pH setpoint or range includes at least one pH between about pH 7.12 and about pH 7.19;

(v) a temperature of the water stream measured by the at least one pH and temperature sensor is between about 17° C. and about 20° C. and the target pH setpoint or range includes at least one pH between about pH 7.00 and about pH 7.12;

(vi) a temperature of the water stream measured by the at least one pH and temperature sensor is between about 20° C. and about 22° C. and the target pH setpoint or range includes at least one pH between about pH 6.90 and about pH 7.00;

(vii) a temperature of the water stream measured by the at least one pH and temperature sensor is between about 22° C. and about 25° C. and the target pH setpoint or range includes at least one pH between about pH 6.72 and about pH 6.90;

(viii) a temperature of the water stream measured by the at least one pH and temperature sensor is between about 25° C. and about 27° C. and the target pH setpoint or range includes at least one pH between about pH 6.56 and about pH 6.72; and (ix) a temperature of the water stream measured by the at least one pH and temperature sensor is between about 27° C. and about 30° C. and the target pH setpoint or range includes at least one pH between about pH 6.30 and about pH 6.56.

23. The automated chemical dosing system of claim 1, wherein the coagulant comprises ferric chloride and at least one of the following is true:

(i) a temperature of the water stream measured by the at least one pH and temperature sensor is between about 0.5° C. and about 5° C. and the target pH setpoint or range includes at least one pH between about pH 6.52 and about pH 6.57;

(ii) a temperature of the water stream measured by the at least one pH and temperature sensor is between about 5° C. and about 10° C. and the target pH setpoint or range includes at least one pH between about pH 6.39 and about pH 6.52;

(iii) a temperature of the water stream measured by the at least one pH and temperature sensor is between about 10° C. and about 15° C. and the target pH setpoint or range includes at least one pH between about pH 6.27 and about pH 6.39;

(iv) a temperature of the water stream measured by the at least one pH and temperature sensor is between about 15° C. and about 17° C. and the target pH setpoint or range includes at least one pH between about pH 6.21 and about pH 6.27;

(v) a temperature of the water stream measured by the at least one pH and temperature sensor is between about 17° C. and about 20° C. and the target pH setpoint or range includes at least one pH between about pH 6.10 and about pH 6.21;

(vi) a temperature of the water stream measured by the at least one pH and temperature sensor is between about 20° C. and about 22° C. and the target pH setpoint or range includes at least one pH between about pH 5.99 and about pH 6.10;

(vii) a temperature of the water stream measured by the at least one pH and temperature sensor is between about 22° C. and about 25° C. and the target pH setpoint or range includes at least one pH between about pH 5.77 and about pH 5.99;

(viii) a temperature of the water stream measured by the at least one pH and temperature sensor is between about 25° C. and about 27° C. and the target pH setpoint or range includes at least one pH between about pH 5.57 and about pH 5.77; and (ix) a temperature of the water stream measured by the at least one pH and temperature sensor is between about 27° C. and about 30° C. and the target pH setpoint or range includes at least one pH between about pH 5.27 and about pH 5.57.

24. The automated chemical dosing system of claim 1, further comprising a polymer dosing device, wherein the instructions, when executed by the processor, cause the processor to further perform the steps of:

(f) determining, in a polymer dosing PID control loop and based on the data communicated to the computer and the coagulant dosing rate, a target polymer dosing rate setpoint or range; and (g) commanding, in the polymer dosing PID control loop, the polymer dosing device to increase, decrease, or maintain a polymer dosing rate to achieve the polymer dosing rate setpoint or range.

25. The automated chemical dosing system of claim 24, wherein the polymer dosing PID control loop is separate from the first and second PID control loops.

26. The automated chemical dosing system of claim 24, wherein the computer further comprises a computer memory storing a data structure in which a lookup table is encoded, wherein the lookup table corresponds to an optimal polymer dosing rate at each of a plurality of coagulant concentrations, and wherein the processor performs a lookup in the lookup table when performing step (f).

* * * * *